United States Patent
Kinney et al.

(10) Patent No.: US 11,102,029 B1
(45) Date of Patent: *Aug. 24, 2021

(54) INTEGRATION OF KNOB SENSORS IN MONITORING SYSTEMS

(71) Applicant: Alarm.com Incorporated, Tysons, VA (US)

(72) Inventors: Abraham Joseph Kinney, Vienna, VA (US); Daniel Todd Kerzner, McLean, VA (US); Jeffrey A. Bedell, Tysons, VA (US); David James Hutz, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/672,944

(22) Filed: Nov. 4, 2019

Related U.S. Application Data

(63) Continuation of application No. 15/812,468, filed on Nov. 14, 2017, now Pat. No. 10,469,283.

(60) Provisional application No. 62/421,485, filed on Nov. 14, 2016.

(51) Int. Cl.
*H04L 12/28* (2006.01)
*G08B 21/00* (2006.01)

(52) U.S. Cl.
CPC ......... *H04L 12/2825* (2013.01); *G08B 21/00* (2013.01); *H04L 12/2807* (2013.01); *H04L 12/2818* (2013.01); *H04L 2012/285* (2013.01); *H04L 2012/2845* (2013.01)

(58) Field of Classification Search
CPC ........ G08B 21/00; G08B 21/04; G08B 21/24; G08B 21/22; G08B 13/08; F24C 7/08; H05B 6/64; Y10T 16/487; H04L 12/2825; H04L 12/2807; H04L 12/2818; H04L 2012/2845; H04L 2012/285
USPC ......... 340/3.1, 3.43, 3.44, 3.7; 700/291, 293
See application file for complete search history.

(56) References Cited

U.S. PATENT DOCUMENTS

| | | | |
|---|---|---|---|
| 5,608,378 | A | 3/1997 | McLean |
| 6,420,969 | B1 | 7/2002 | Campbell |
| 6,563,430 | B1 | 5/2003 | Kennink |
| 6,642,852 | B2 | 11/2003 | Dresti et al. |
| 7,002,109 | B2 | 2/2006 | Klask |

(Continued)

FOREIGN PATENT DOCUMENTS

| | | |
|---|---|---|
| CN | 105276637 | 1/1916 |
| EP | 2843965 B1 | 12/1916 |

*Primary Examiner* — Nam V Nguyen
(74) *Attorney, Agent, or Firm* — Fish & Richardson P.C.

(57) ABSTRACT

Techniques are described for using information from a knob sensor of an appliance in a property monitoring system. In some implementations, a monitoring system may be configured to receive sensor information from a knob, receive monitoring device information from a monitoring device and, based on the sensor information from the knob, identify a knob event. The monitoring system may integrate the knob event with the monitoring device information and analyze the integrated knob event and monitoring device information against one or more rules related to usage of the appliance in view of the state of the property. Based on analyzing the integrated knob event and monitoring device information, the monitoring system may determine whether to perform an action, such as notifying a user or activating an appliance.

20 Claims, 8 Drawing Sheets

(56) References Cited

U.S. PATENT DOCUMENTS

| | | |
|---|---|---|
| 7,110,836 B2 | 9/2006 | Sturm et al. |
| 7,816,818 B2 | 10/2010 | Sellecchia |
| 7,999,689 B1 | 8/2011 | Ray et al. |
| 8,610,036 B2 | 12/2013 | Ewell, Jr. |
| 8,760,258 B2 | 6/2014 | Marriam |
| 8,890,034 B2 | 11/2014 | Mishra |
| 8,941,483 B2 | 1/2015 | Davis |
| 9,118,220 B2 | 8/2015 | Lamb |
| 9,390,600 B1 | 7/2016 | Sirotkin |
| 9,439,530 B2 | 9/2016 | Logan et al. |
| 9,449,219 B2 * | 9/2016 | Bilet .................. G06Q 50/12 |
| 9,536,413 B2 | 1/2017 | Shao |
| 9,665,892 B1 | 5/2017 | Reeser |
| 9,739,489 B2 | 8/2017 | Ronk |
| 10,469,283 B1 * | 11/2019 | Kinney ................. G08B 21/00 |
| 2005/0109333 A1 | 5/2005 | Thomas |
| 2006/0202848 A1 | 9/2006 | Volodarsky |
| 2010/0231506 A1 | 9/2010 | Pryor |
| 2012/0325197 A1 | 12/2012 | Legaspi |
| 2013/0092032 A1 | 4/2013 | Cafferty et al. |
| 2014/0208958 A1 | 7/2014 | Porraro |
| 2014/0251987 A1 | 9/2014 | Reay |
| 2015/0102928 A1 | 4/2015 | Sirotkin |

* cited by examiner

INTEGRATION OF KNOB SENSORS IN MONITORING SYSTEMS

CROSS-REFERENCE TO RELATED APPLICATIONS

This application is a continuation of U.S. application Ser. No. 15/812,468, filed Nov. 14, 2017, now U.S. Pat. No. 10,469,283, which claims the benefit of U.S. Provisional patent Application No. 62/421,485, filed on Nov. 14, 2016. Both of these prior applications are incorporated by reference in their entirety.

TECHNICAL FIELD

This disclosure application relates generally to property monitoring technology.

BACKGROUND

When someone wishes to use an appliance, that person may need to set a timer, look up a recipe, or complete various other tasks. Alternatively, that person may forget that the appliance is on, or may need to control other appliances in the home.

SUMMARY

Techniques are described for integrating sensor data collected from a knob of an appliance control with other monitoring device information to determine whether to perform an action related to a property monitoring system.

In some implementations, a monitoring system may include a knob of an appliance that includes a position sensor and that is configured to generate sensor information that indicates a position of the knob. The monitoring system may also include a monitoring device that is configured to generate monitoring device information based on detecting a state of a property monitored by the monitoring system and a monitoring control unit, where the monitoring control unit may be configured to receive sensor information from the knob and monitoring device information from the monitoring device. Based on the sensor information, the monitoring control unit may identify a knob event that indicates the position of the knob, integrate the knob event with the monitoring device information, and analyze the integrated knob event and monitoring device information against one or more rules related to usage of the appliance in view of the state of the property. Based on analyzing the integrated knob event and monitoring device information against the one or more rules related to usage of the appliance in view of the state of the property, the monitoring control unit may determine whether to perform an action related to the monitoring system.

In some implementations, the monitoring control unit may determine that the knob has activated the appliance, and based on that determination, generate and provide for output a notification that requests setting a timer. In some implementations, the monitoring control unit may provide a notification that indicates a state of the appliance caused by the knob event.

In some implementations, the monitoring control unit may determine that the knob event has activated the appliance and that a person exited the property after identifying the knob event. Based on these determinations, the monitoring control unit may generate and provide for output a notification indicating that the appliance is in an activated state. In some implementations, the monitoring control unit may further provide a notification indicating data identifying the monitoring device information. In some implementations, the monitoring control unit may determine that a person exited the property by analyzing motion sensor data received from a motion sensor located at the property. In some implementations, the monitoring control unit may determine that a person exited the property by analyzing location data that is received from a mobile device of the person and that indicates a location of the mobile device.

In some implementations, the monitoring control unit may determine that the knob event has activated the appliance. Based on the appliance being in an active state, the monitoring control unit may determine that an additional appliance should be in an active state and the control unit may activate the additional appliance. In some implementations, based on activating the additional appliance, the monitoring system may provide for output a notification that indicates that the additional appliance is in an activated state.

In some implementations, the monitoring control unit may analyze the integrated knob event and monitoring device information against one or more user-defined rules related to usage of the appliance in view of the state of the property.

In some implementations, the monitoring control unit may determine property usage patterns of a resident of the property and knob interaction patterns that reflect usage patterns of the knob and generate the one or more rules related to usage of the appliance based on the property usage patterns and the knob interaction patterns.

In some implementations, the monitoring control unit may determine that the knob is positioned to activate the appliance and that the property is experiencing a power outage. Based on the determinations, the monitoring control unit may generate and provide for output a notification indicating that the knob is positioned to activate the appliance and that the property is experiencing the power outage.

In some implementations, the monitoring control unit may determine that the knob event has activated the appliance and that a motion detector in an area of the property with the appliance has not detected movement for a particular period of time. Based on determining that the particular period of time exceeds a threshold period of time, the monitoring control unit may generate and provide for output a notification indicating that the appliance is in an activated state.

In some implementations, the knob may be from an appliance such as a stove, oven, dishwasher, washing machine, or other kitchen or household appliance. The appliance may be located in a residence, a commercial property (e.g., a restaurant), a factory, or other property. The sensor data from the knob may include the position of the knob or the rotation of the knob. In some examples, the sensor data from the knob may detect gas, smoke, or particulate matter. The sensor data from the knob may also indicate pressure, vibration, temperature, or other physical phenomena. The knob may contain one or more of various sensors.

The knob sensor data may relate to one or more knob events. For example, the position of the knob may indicate the status of the appliance or a feature of the appliance (e.g., the left front stove burner is set to high), or the rotation of the knob may indicate that the appliance or a feature of the appliance has been turned from off to on (e.g. the stove exhaust fan has been turned on).

The monitoring control unit may integrate the knob event with any of various monitoring device information. In some implementations, monitoring device information may include data from other sensors located on the property (e.g, cameras, motion sensors, heat sensors, pressure sensors, temperature sensors, microphones, detectors), the monitoring system status (e.g., armed, disarmed), historical usage data related to the appliance or other appliances, or other data available to the monitoring system.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for integrating sensor data collected from a knob of an appliance with property monitoring data. A system uses the sensor data collected from the knob to perform actions related to a monitoring system of a property, including setting a timer, controlling other appliances in the property, alerting emergency responders, and various other tasks.

Figure 1:
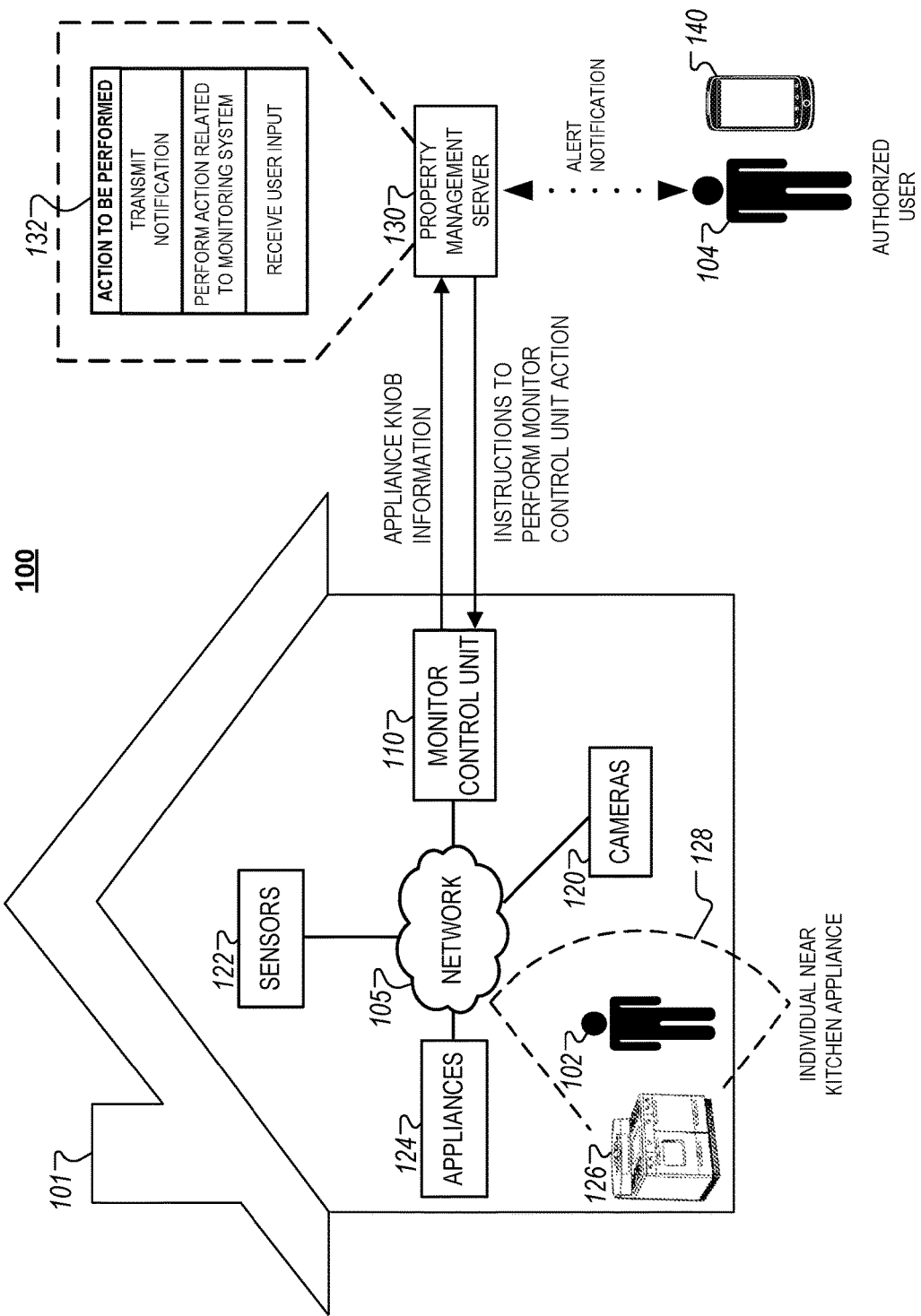
FIGS. 1-2 illustrate example systems that integrate sensor data collected from a knob for an appliance with property monitoring data.

FIG. 1 illustrates a diagram of an example of an integrated system 100 associated with a property 101. In some examples, the system can be used to control appliances within the property 101 based on sensor data collected from a knob for an appliance, such as a stove. While the following description is drafted in the context of a stove, it is understood that the disclosure can be directed to various appliances, such as an independent range, an outdoor grill, a toaster oven, or other appliances that use knobs capable of being equipped with a knob sensor.

The system 100 may include a monitoring control unit 110, one or more cameras 120, one or more sensors 122, one or more appliances 124, a property management server 130 that manages monitoring system data received from the monitoring control unit, and an authorized user device 140. In some examples, a specific appliance 126, such as a stove, includes a control element containing a sensor. For example, the stove 126 can include a knob with a sensor. The appliance 126 may be any of various types of appliances, such as a dishwasher, a dryer, a washing machine, a toaster, etc. The server 130 may maintain data that defines which users are authorized users 104, which devices are authorized user devices 140, and what actions related to a monitoring system of the property 101 to take based on received data.

The property 101 may include various monitoring devices. For example, the property 101 may include cameras, sensors, and other devices that provide monitoring data associated with devices and areas of the property 101. Cameras located on the property 101 may provide video, still images, or other monitoring data, and may provide data via a live feed, transmit data to be stored in a remote location, store data locally for review at a later time, etc. Sensors located on the property 101 may include motion sensors, heat sensors, pressure sensors, resistive sensors, etc. Sensors may communicate with the monitoring control unit 110 and transmit monitoring data for processing to the monitoring control unit 110. In some examples, sensors located on the property 101 may store collected data locally or transmit monitoring data to be stored in a remote location.

The monitoring control unit 110 includes a controller and a network module. The controller is configured to control a monitoring system (e.g., a home alarm or security system) that includes the monitoring control unit 110. In some examples, the controller may include a processor or other control circuitry configured to execute instructions of a program that controls operation of an alarm system. In these examples, the controller may be configured to receive input from sensors, detectors, or other devices included in the alarm system and control operations of devices included in the alarm system or other household devices (e.g., a thermostat, an appliance, lights, etc.). For example, the controller may be configured to control operation of the network module included in the monitoring control unit 110.

The network module is a communication device configured to exchange communications over a network 105. The network module may be a wireless communication module configured to exchange wireless communications over the network 105. For example, the network module may be a wireless communication device configured to exchange communications over a wireless data channel and a wireless voice channel. In this example, the network module may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module may also be a wired communication module configured to exchange communications over the network 105 using a wired connection. For instance, the network module may be a modem, a network interface card, or another type of network interface device. The network module may be an Ethernet network card configured to enable the monitoring control unit 110 to communicate over a local area network and/or the Internet. The network module also may be a voice-band modem configured to enable the alarm panel to communicate over the telephone lines of Plain Old Telephone Systems (POTS).

In some examples, the monitoring control unit 110 may include data capture and recording devices. In these examples, the monitoring control unit 110 may include the cameras 120, one or more motion sensors, one or more microphones, one or more biometric data collection tools, one or more temperature sensors, one or more humidity sensors, one or more air flow sensors, and/or any other types of sensors that may be useful in capturing monitoring data related to the property 101 and users in the property.

The monitoring control unit 110 may be configured to communicate with the cameras 120, the sensors 122, the appliances 124 (including the appliance 126), and other devices and systems of the property 101 through a network 105. In some examples, the monitoring control unit 110 may communicate with the cameras 120, the sensors 122, the appliances 124 (including the appliance 126), and other devices and systems of the property 101 directly. For example, the monitoring control unit 110 may directly receive data from the sensors 122, send control signals to the appliances 124, etc. The monitoring control unit 110 may be configured to communicate with the server 130. In some examples, the monitoring control unit 110 may be configured to communicate with the server 130 through the network 105. In some examples, the monitoring control unit 110 may be configured to communicate with the server 130 directly.

The monitoring control unit 110 also may include a communication module that enables the monitoring control unit 110 to communicate with other devices of the system 100. The communication module may be a wireless communication module that allows the monitoring control unit 110 to communicate wirelessly. For instance, the communication module may be a Wi-Fi module that enables the monitoring control unit 110 to communicate over a local wireless network at the property 101. The communication module further may be a 900 MHz wireless communication module that enables the monitoring control unit 110 to communicate directly with a monitoring control unit. Other types of short-range wireless communication protocols, such as Bluetooth, Bluetooth LE, Z-Wave, ZigBee, etc., may be used to allow the monitoring control unit 110 to communicate with other devices in the property 101.

The monitoring control unit 110 further may include processor and storage capabilities. The monitoring control unit 110 may include any suitable processing devices that enable the monitoring control unit 110 to operate applications and perform the actions described throughout this disclosure. In addition, the monitoring control unit 110 may include solid state electronic storage that enables the monitoring control unit 110 to store applications, configuration data, collected sensor data, and/or any other type of information available to the monitoring control unit 110.

The monitoring control unit 110 may exchange communications with the sensors 122, the appliances 124, the cameras 120, the knob for the appliance 126, and the property management server 130 using multiple communication links. The multiple communication links may be a wired or wireless data pathway configured to transmit signals from sensors 122, the appliances 124, the cameras 120, the knob for the appliance 126, and the property management server 130 to the controller. The sensors 122, the appliances 124, the cameras 120, the knob for the appliance 126, and the property management server 130 may continuously transmit sensed values to the controller, periodically transmit sensed values to the monitoring control unit 110, or transmit sensed values to the monitoring control unit 110 in response to a change in a sensed value or prompt from the monitoring control unit 110.

The multiple communication links may include a local network. The sensors 122, the appliances 124, the cameras 120, the knob for the appliance 126, and the property management server 130 and the monitoring control unit 110 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

In some implementations, the monitoring control unit 110 may additionally be used to perform routine surveillance operations on a property. For instance, the monitoring control unit 110 may be assigned to one or more particular properties within a geographic location and may routinely collect surveillance footage during specified time periods (e.g., after dark), which may then be transmitted to the property management server 130 for transmitting back to each particular property owner. In such implementations, the property owner may receive the surveillance footage over the network 105 as a part of a service provided by a security provider that operates the property management server 130. For example, transmissions of the surveillance footage collected by the monitoring control unit 110 may be part of a premium security service package provided by a security provider in addition to the routine drone emergency response service.

In some implementations, the monitoring control unit 110 may monitor the operation of the electronic devices of the system 100 such as sensors 122, the appliances 124, the cameras 120, the knob for the appliance 126, and the property management server 130. For instance, the monitoring control unit 110 may enable or disable the devices of the system 100 based on a set of rules associated with energy consumption, user-specified settings, and/or other information associated with the conditions near or within the property 101 where the system 100 is located. In some examples, the monitoring control unit 110 may be used as a replacement to a traditional security panel (or monitoring control unit) that is used to monitor and control the operations of the system 100. In other examples, the monitoring control unit 110 may coordinate monitoring operations with a separate security panel of the system 100. In such examples, the monitoring control unit 110 may monitor particular activities of the devices of the system 100 that are not monitored by the security panel, or monitor the operation of particular devices that are not currently being monitored by the security panel.

In some examples, a monitoring system may not be used. In these examples, the systems and devices within the property 101 (e.g., the cameras 120, the sensors 122, the appliances 124, etc.) communicate directly with the server 130 over a long-range communication protocol.

The network 105 is configured to enable exchange of electronic communications between devices connected to the network 105. For example, the network 105 may be configured to enable exchange of electronic communications between the monitoring control unit 110, the sensors 122, the appliances 124, the cameras 120, the knob for the appliance 126 and the property management server 130. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The system 100 includes one or more cameras 120. In some examples, the cameras 120 are part of the monitoring system for the property 101. The cameras 120 may be video/photographic cameras or other type of optical sensing devices configured to capture images. For instance, the cameras 120 may be configured to capture images of an area within a building monitored by the monitoring control unit 110. The cameras 120 may be configured to capture single, static images of the area and also video images of the area in which multiple images of the area are captured at a relatively high frequency (e.g., thirty images per second). The cameras 120 may be controlled based on commands received from the monitoring control unit 110.

The cameras 120 may be triggered by several different types of techniques. For instance, a Passive Infra Red (PIR) motion sensor may be built into the cameras 120 and used to trigger the cameras 120 to capture one or more images when motion is detected. The cameras 120 also may include a microwave motion sensor built into the camera and used to trigger the cameras 120 to capture one or more images when motion is detected. The cameras 120 may have a "normally open" or "normally closed" digital input that can trigger capture of one or more images when external sensors (e.g., the sensors 122, PIR, door/window, etc.) detect motion or other events. In some implementations, the cameras 120 receives a command to capture an image when external devices detect motion or another potential alarm event. The cameras 120 may receive the command from the controller or directly from one of the sensors 122.

In some examples, the cameras 120 trigger integrated or external illuminators (e.g., Infra Red, Z-wave controlled "white" lights, etc.) to improve image quality when the scene is dark. An integrated or separate light sensor may be used to determine if illumination is desired and may result in increased image quality.

The cameras 120 may be programmed with any combination of time/day schedules, system "arming state", or other variables to determine whether images should be captured or not when triggers occur. The cameras 120 may enter a low-power mode when not capturing images. In this case, the cameras 120 may wake periodically to check for inbound messages from the controller. The cameras 120 may be powered by internal, replaceable batteries if located remotely from the monitoring control unit 110. The cameras 120 may employ a small solar cell to recharge the battery when light is available. Alternatively, the cameras 120 may be powered by the monitor control unit's 110 power supply if the cameras 120 is co-located with the controller.

In some implementations, the cameras 120 communicate directly with the property management server 130 over the Internet. In these implementations, image data captured by the cameras 120 does not pass through the monitoring control unit 110 and the cameras 120 receives commands related to operation from the property management server 130.

The system 100 also includes one or more sensors or detectors. For example, the monitoring system may include multiple sensors 122. The sensors 122 may include a contact sensor, a motion sensor, a glass break sensor, or any other type of sensor included in an alarm system or security system. The sensors 122 also may include an environmental sensor, such as a temperature sensor, a water sensor, a rain sensor, a wind sensor, a light sensor, a smoke detector, a carbon monoxide detector, an air quality sensor, etc. The sensors 122 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 122 may include a radio-frequency identification (RFID) sensor that identifies a particular article that includes a pre-assigned RFID tag.

The authorized device 140 can include a native surveillance application. In some examples, the native surveillance application is associated with the monitoring system for the property 101. The native surveillance application may be a software/firmware program configured to run on various devices that enables the user interface and features described throughout. The authorized device 140 may load or install the native surveillance application based on data received over a network (e.g., the network 105) or data received from local media. The native surveillance application runs on mobile devices platforms. The native surveillance application also enables the authorized device 140 to receive and process image and sensor data from the monitoring system.

In some implementations, the authorized device 140 communicates with and receives monitoring system data from the monitoring control unit 110 using a communication link. For instance, the authorized device 140 may communicate with the monitoring control unit 110 using various local wireless protocols such as Wi-Fi, Bluetooth, Z-Wave, ZigBee, HomePlug (Ethernet over powerline), or wired protocols such as Ethernet and USB, to connect the authorized device 140 to local security and automation equipment. The authorized device 140 may connect locally to the monitoring system and sensors 122 and other devices. The local connection may improve the speed of status and control communications because communicating through a network, such as the Internet or the network 105 with a remote server (e.g., the property management server 130) may be significantly slower.

Although the authorized device 140 is shown as communicating with the property management server 130, the authorized device 140 may also communicate directly with the monitoring control unit 110, the cameras 120, the sensors 122, the appliances 124, and other devices controlled by the monitoring control unit 110 when the authorized device 140 is near the property 101. For example, the authorized device 140 may exchange communications with the devices of the system 100 over the network 105.

In some implementations, the authorized device 140 receives monitoring system data captured by the monitoring control unit 110 through the network 105. The authorized device 140 may receive the data from the monitoring control unit 110 through the network 105 or the property management server 130 may relay data received from the monitoring control unit 110 to the authorized device 140 through the network 105. In this regard, the property management server 130 may facilitate communication between the authorized device 140 and the monitoring system.

Although FIG. 1 illustrates one property for brevity, the server 130 may manage monitoring systems and monitoring control units for many more properties and/or structures. For example, the system 100 may include several monitoring systems each associated with a respective multiple, different properties and the server 130 may manage actions, users, and devices for each of the different properties. The multiple, different properties may be owned by the same entity. For example, a single person may own all of the properties. In some examples, the multiple, different properties may be operated by different entities (e.g., owned by different entities) with single entities operating groups of properties. For example, each property may be a rental property owned by a different person, and a single property management company may be managing all of the rental properties using the system. In some examples, the property 101 is a commercial or industrial property, such as a restaurant or a factory.

The appliances 124 may be home automation devices connected to the network 105 that are configured to exchange electronic communications with other devices of the system 100. The appliances 124 may include, for example, connected appliances, controllable light sources, safety and security devices, energy management devices, and/or other types of electronic devices capable of exchanging electronic communications over the network 105. In some examples, the appliances 124 may include appliances, such as stoves, ranges, exhaust fans, ovens, etc. In some instances, the appliances 124 may periodically transmit information and/or generated data to the monitoring control unit 110 such that the monitoring control unit 110 can automatically control the operation of the appliances 124 based on the exchanged communications. For example, the monitoring control unit 110 may operate one or more of the appliances 124 based on a fixed schedule specified by the user. In another example, the monitoring control unit 110 may enable or disable one or more of the appliances 124 based on received sensor data from the sensors 122.

The property management server 130 is an electronic device configured to provide monitoring services by exchanging electronic communications with the monitoring control unit 110 and the authorized device 140 over a network, such as the Internet, a LAN, etc. In some examples, the network is the network 105. For example, the property management server 130 may be configured to monitor events (e.g., events associated with the appliance 126) generated by the monitoring control unit 110. In this example, the property management server 130 may exchange electronic communications with the network module included in the monitoring control unit 110 to receive information regarding events (e.g., alarm events) detected by the monitoring control unit 110. The property management server 130 also may receive information regarding events from the authorized device 140.

In some implementations, the property management server 130 may route alarm data received from the network module or the authorized device 140 to a central alarm station server that is maintained by a third-party security provider. The alarm data can include captured video footage of the detected individual within a specific area of the property 101, which is processed by the third-party security provider to request emergency assistance to the property 101. For example, the alarm data can be transmitted to law enforcement to indicate a potential security breach within the property 101. In some instances, the alarm data can also include metadata identified by the monitoring control unit 110 within the captured video footage (e.g., gender of the individual, suspected identity of the individual, key physical attributes, etc.). In these examples, the alarm data can either be transmitted to law enforcement after requesting confirmation from the user, or automatically transmitted without intervention from the user.

The property management server 130 may store sensor and image data received from the monitoring control unit 110 and perform analysis of the sensor and image data. Based on the analysis, the property management server 130 may communicate with and control aspects of the monitoring control unit 110 or the authorized device 140.

The operations performed by the system 100 may enhance safety when using appliances. In some examples, the server 130 receives sensor data from the knob of the appliance 126. The server 130 may provide a web interface that enables users (e.g., residents of the property 101, monitoring system operators, authorized users, etc.) to manage alerts, notifications, and monitoring system actions (e.g., contacting emergency responders, controlling other appliances 124 in the property 101, analyzing monitoring system data collected by the monitoring control unit 110, etc.). In these implementations, the server 130 further receives data related to settings for the monitoring system controlled by the monitoring control unit 110.

The server 130 may provide a web interface that enables a user to define operational settings for the property 101 (e.g., alert profiles, energy management profiles, thermostat profiles, rules related to use of the appliances 124, and specifically the appliance 126, etc.). In some examples, the individual near the appliance 102 may define and update settings for appliances, devices, and systems of the property 101. In some examples, the authorized user 104 may make changes to settings and profiles for appliances, devices, and systems of the property 101 through the authorized device 140. An authorized user 104 operating the authorized user device 140 may be the same user as an individual near the appliance 102. For example, the individual near the appliance 102 may be authorized to receive alerts associated with the appliance 126 and may be interacting with the appliance 126.

In general, the system 100 can be configured to respond to a knob event detected by the knob sensor of the appliance 126. In some examples, the knob sensor may be a rotary sensor that detects a rotation of the knob of the appliance 126. In some examples, the knob sensor may be an IR sensor that detects a proximity of the individual 102. In some examples, the knob sensor may be a switch that detects an on/off position of the knob of the appliance 126. In some examples, the knob sensor may be a thermocouple that senses a temperature of the knob and an area of the appliance 126. In some examples, the knob sensor may be a particle detector that detects gas or smoke in the proximity of the appliance 126. The knob sensor may be various other sensors, such as a pressure sensor, a microphone, a photoresistor, etc. In some examples, the knob of the appliance 126 includes multiple, different sensors. For example, the knob may include a temperature sensor as well as a rotary sensor.

In some examples, the knob sensor may be a vibration sensor. The knob may include a vibration sensor that detects vibrations from the appliance 126 during normal operation. For example, the knob sensor may be a vibration sensor that detects when a dryer, a washing machine, or a dishwasher has finished its cycle. In some examples, the server 130 may determine a state of the appliance 126 using the data received from the knob sensor. For example, the server 130 may determine, based on the sensed vibration, that the washing machine is in a spin cycle or that the washing machine is in a rinse cycle. As another example, the server 130 may determine, based on sensing an abnormal vibration (e.g., decreased or increased magnitude of vibration), that a washing machine 126 is not operating properly and needs to be serviced.

In some examples, the knob for the appliance 126 may be included with the appliance 126 at the time the appliance 126 is purchased. In some examples, the knob sensor may be installed after the purchase of the appliance 126. In some examples, the knob sensor may be installed as a replacement knob for an original knob of the appliance 126. In some examples, the knob sensor may be installed as a sleeve over the original knob of the appliance 126. For example, the knob sensor may be attached magnetically to the original knob of the appliance. In some examples, the knob sensor may be leveled such that a specific reading of the sensor is obtained when the knob for the appliance 126 is in the off position. For example, the knob sensor may be leveled such that a reading of 0° rotation is obtained when the knob for the appliance 126 is in the off position. In some examples, the knob sensor may be calibrated after installation. For example, the server 130 can receive initial measurements from the knob sensor at specific positions (e.g., off, half-power, fully-on, etc.) to calibrate subsequent measurements received from the knob sensor for the appliance 126.

In some examples, the system 100 may be configured to respond to a knob event detected by the knob for the appliance 126 that is triggered by the individual 102 based on monitoring a detectable region 128 of the property 101 and determine an appropriate action to be performed in response based on one or more actions specified by the server 130. In some examples, the detectable region 128 may be a region detected by the sensor in the knob of the appliance 126. For example, if the knob includes an IR sensor, the detectable region 128 may include an area in front of the appliance 126 to determine whether a person is within the vicinity of the appliance 126, occupancy of an area of the property 101 in which the appliance is located, etc.

The server 130 may include actions 132 available in response to knob events detected. For example, in response to data received from the monitoring control unit 110 indicating that the knob for the appliance 126 detecting that the knob has been moved from the off position to the on position, the server 130 may access the available actions 132 and determine that it is necessary to transmit an alert to the authorized device 140. In some examples, the server 130 may transmit the alert directly to the authorized device 140. In some examples, the server 130 may transmit instructions to the monitoring control unit 110 to send the alert to the authorized device 140. In some examples, the server 130 may transmit instructions to the monitoring control unit 110 to perform an action related to the monitoring system of the property 101. In some examples, the server 130 may transmit control signals directly to a system or device of the monitoring system.

In the example depicted in FIG. 1, the knob sensor for the appliance 126 initially detects a knob event within the detectable region 128 triggered by the individual 102. The knob for the appliance 126 then transmits a signal including knob event information (e.g., timestamp of the knob event, detected sensor data within the detectable region 128, footage of the individual 102 captured by the cameras 120, etc.) to the monitoring control unit 110. In response, the monitoring control unit 110 gathers additional information for the property 101 from the sensors 122, the appliances 124, and various other devices and system and then transmits the gathered data to the server 130.

After receiving the gathered data, the server 130 accesses the available actions 132 to determine an appropriate action to be performed based on the information included within the gathered data. After determining an appropriate action to be performed, the property management server 130 transmits instructions to perform the action to be performed to the monitoring control unit 110, which then transmits corresponding signals to one or more of the cameras 120, sensors 122, or the appliances 124. In some instances, the action to be performed may include transmitting an event notification indicating the detected knob event and other associated information to the authorized device 140 of the authorized user 104.

The server 130 may maintain a database that stores integrated knob event data and property usage data (e.g., appliance 126 usage data, occupancy data, thermostat usage data, etc.). In some examples, the server 130 or the monitoring control unit 110 maintains the property usage data. The server 130 may analyze the integrated knob event data and property usage data to provide alerts/reports based on both events related to the appliance 126 and property usage data. For example, the server 130 may monitor sensors on doors to the exterior of the property 101 to determine whether a user who turned on the appliance 126 has left the property, and whether to issue an alert that the stove is still on.

The server 130 may communicate with the monitoring control unit 110 to control operations of devices and systems located on the property 101. For example, if a user of the appliance 126 has turned the appliance on and is detected in proximity to the appliance 126 by the knob sensor, systems such as the security system may be disarmed. In some examples, if the knob for the appliance 126 detects an event indicating that the stove has been turned on, the server 130 may turn on an exhaust fan of the appliance 126.

In some examples, the knob sensor described throughout this disclosure may have firmware and processing capabilities that allow the server 130 to control settings, access data, etc. at the knob for the appliance 126. In some examples, the knob for the appliance 126 may engage in two-way communications with the monitoring control unit 110 over a short-range wireless communication protocol. In this example, the monitoring control unit 110 includes communication components that allow the monitoring control unit 110 to perform two-way communication with the knob for the appliance 126 over the short-range wireless communication protocol and to perform two-way communication with the server 130 over a long-range communication protocol (e.g., a long-range wired or wireless communication protocol). The monitoring system 110 may serve as an intermediary between the server 130 and the knob for the appliance 126 to enable the server 130 to remotely program and manage the knob for the appliance 126 and also to receive reports when events (e.g., turn on, full-power, unusually high temperatures, no users in the vicinity, etc.) are detected by the knob for the appliance 126.

In some examples, the knob for the appliance 126 performs relatively few processing operations and the monitoring control unit 110 performs control processing for the knob for the appliance 126. In these examples, the monitoring control unit 110 may include an electronic storage device that stores available actions 132 to be performed based on the event detected by the knob for the appliance 126 and also includes a processor that performs the decision making processing to determine whether and which action should be performed. For instance, the monitoring control unit 110 can store the available actions 132 and determine from the unusually high temperature event detected by the knob for the appliance 126 that an alert notification should be sent to the authorized device 140. In some examples the monitoring control unit 110 transmits the event data from the knob for the appliance 126 to the server 130 for processing. For example, the monitoring control unit 110 may transmit event data from the knob for the appliance 126 to the server 130. The server 130 may determine that from the data that no users are in the vicinity of the appliance 126, and may determine, using the available actions 132, that a notification should be sent to the authorized device. In some examples, the server 130 transmits instructions to the monitoring control unit 110 to perform the action. In some examples, the server 130 performs the action. In other examples, the monitoring control unit 110 performs relatively few processing operations and serves to primarily exchange communications between the knob for the appliance 126 and the server 130.

The authorized device 140 may be an electronic device associated with a property owner or an occupant that exchanges communications over a network, such as the Internet or the network 105. For example, the authorized device 140 may be smartphones, tablets, personal computers (PCs), network-enabled media players, home entertainment systems, cloud storage devices, and other types of network devices. In some implementations, the authorized device 140 may be a smart speaker or an electronic home assistant. The authorized device 140 may access a service made available by the property management server 130 on the network 105, such as a mobile application. The data generated by the authorized device 140 may include over the network 105, which may be monitored by the monitoring control unit 110.

The system 100 intelligently leverages the knob for the appliance 126 and the monitoring control unit 110 to aid in security monitoring and property automation. For example, the monitoring control unit 110 may aid in investigating alarm events detected at the property 101 by the knob for the appliance 126. In this example, the knob for the appliance 126 may detect that the stove 126 has been left on for an hour, there have been no users in the vicinity of the stove 126 within the last 45 minutes, and that a threshold amount of smoke particles has been detected. The knob for the appliance 126 may transmit the data to the monitoring control unit 110, which may then transmit the information to the server 130. The server 130 may use the available actions 132 to determine that the fire department needs to be notified.

Examples of implementations of the system 100 can use various types of data captured devices within the property 101 (e.g., the cameras 120, the sensors 122, the appliances 124, etc.) to perform different actions based on the present conditions of the property 101. In some instances, the property management server 130 transmits different notifications of an event detected by the knob for the appliance 126 based on the occupancy of the property 101. For example, the server 130 may transmit a notification to the authorized device 140 if the knob detects a stove 126 is turned on and there is no occupancy detected within the property 101. As another example, the server 130 may transmit a low priority notification to the authorized device 140 if there is at least one person detected within the property 101 when a smoke event is detected by the knob for the appliance 126, whereas the server 130 may transmit a high priority notification if there is no occupancy detected within the property 101 when a smoke event is detected by the knob for the appliance 126.

In some instances, the notifications transmitted by the server 130 may be based on a security status of a security system of the property 101. For example, the server 130 may transmit a notification to all users and devices associated with the property 101 in response to data from the knob for the appliance 126 indicating a fire when the security system is armed (e.g., no one is home, everyone is asleep, etc.), whereas the server 130 may transmit a notification only to an administrator user in response to the security status indicating a breach within the property 101 when the security system is unarmed. In other examples, the server 130 may transmit a high-priority alert for an "on" event detected by the knob for the appliance 126 if the security status of the property 101 is set to an "alarmed" mode. For example, if a pet in the property 101 has accidentally turned on the stove 126 while owners of the property 101 are at work, the knob for the appliance 126 may transmit the event data to the monitoring control unit 110 which transmits the data to the server 130, and the server 130 can transmit an image taken by a camera 120 within the property 101 along with a high-priority alert.

In some implementations, the property management server 130 can transmit instructions to the monitoring control unit 110 to adjust one or more settings associated with the devices within the property 101. For instance, in response to the knob for the appliance 126 detecting a threshold level of smoke, the monitoring control unit 110 may receive instructions from the server 130 to turn on an exhaust fan. In such instances, the particular instructions received by the monitoring control unit 110 can be varied based on the identity of the detected individual 102. For example, John may just open a window, whereas Susan may want the exhaust fan on. In other instances, the particular instructions can also be based on other types of information associated with the detected individual 102 (e.g., time difference between an event detected by the knob for the appliance 126 and an opening of the front door of the property 101, etc.).

In some implementations, where the property management server 130 transmits notifications to the authorized device 140, the particular notification transmitted can be based on the location of the authorized device 140. For example, a notification can be prevented from being transmitted if the authorized device 140 is near or with the property 101. In other examples, the property management server 130 can transmit notifications to another remote user if the authorized device 140 is located within the property 101.

In some implementations, the server 130 determines the particular action to be performed in response to an event detected by the knob for the appliance 126 based on monitoring one or more parameters indicated by the data transmitted from the monitoring control unit 110. For instance, as described more particularly with respect to FIGS. 3-7, the available actions 132 can specify different actions to be performed based on occupancy information gathered by the devices within the property 101, the security status indicated by a security system of the property 101, etc. More particular descriptions related to the components of the system 100 are provided below.

Figure 2:
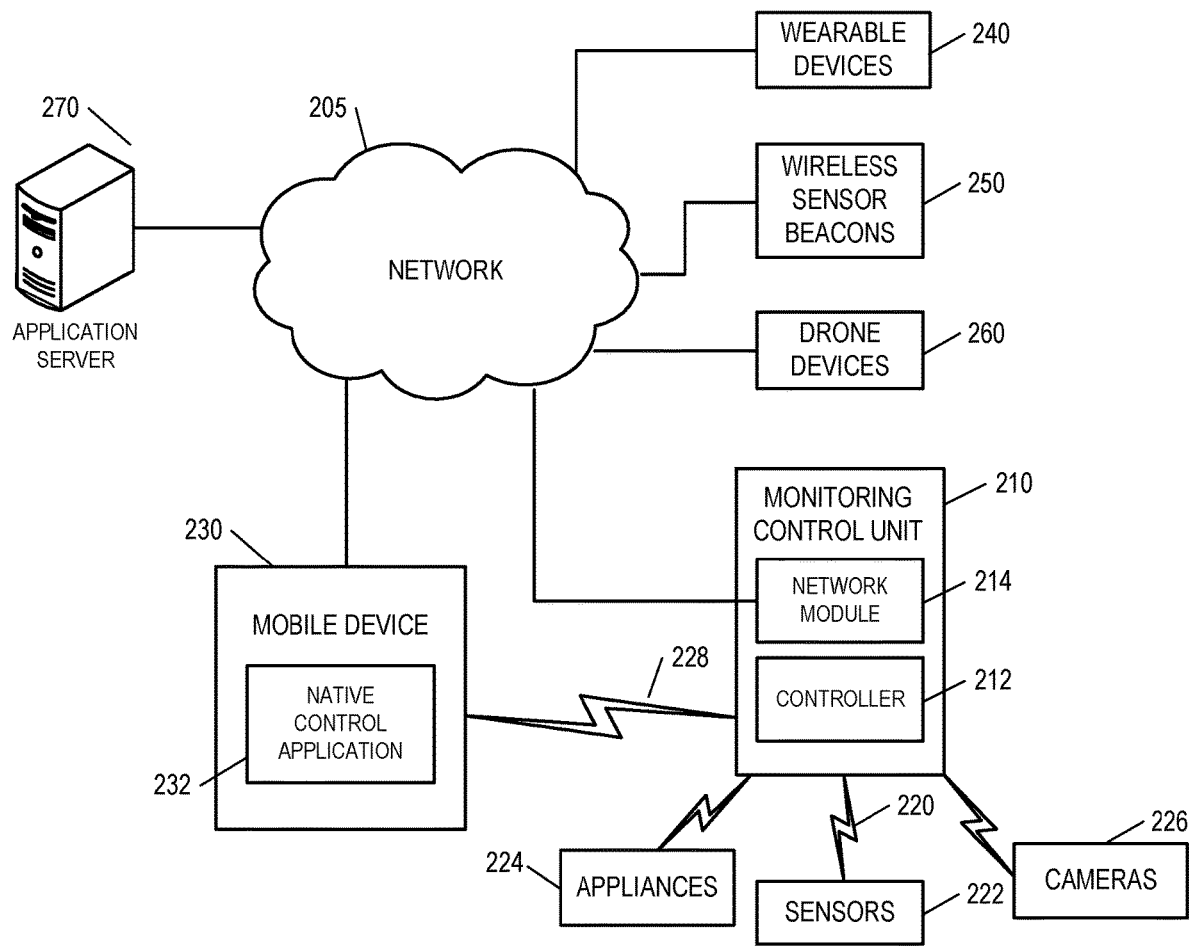

FIG. 2 illustrates a diagram of an example of an integrated system 200. In some examples, the system 200 is an example of the system 100. The system 200 may include a network 205, a monitoring control unit 210, one or more sensors 222, one or more mobile devices 230, one or more wearable devices 240, one or more beacons 250, one or more drone devices 260, and an application server 270. The network 205 may be configured to enable electronic communications between devices connected to the network 205. For example, the network 205 may be configured to enable exchange of electronic communications between the monitoring control unit 210, the sensors 222, the appliances 224, the cameras 226, the mobile device 230, the wearable devices 240, the beacons 250, the drone devices 260, and the application server 270. The network 205 may be similar to the network 105 described with respect to FIG. 1.

The monitoring control unit 210 may include a controller 212 and a network module 214. The controller 212 may be similar to the controller of the monitoring control unit 110 as described with respect to FIG. 1. The network module 214 may be similar to the network module of the monitoring control unit 110 as described with respect to FIG. 1.

The sensors 222 may be similar to the sensors 122 as described with respect to FIG. 1. The sensors 222 may include cameras, pressure sensors, temperature sensors, motion sensors, occupancy sensors, or device sensors that may communicate with the monitoring control unit 210 over the communication link 220. For example, the sensors 222 may provide the monitoring control unit 210 sensor data indicating when users left a home, when users arrived home, what users are home, what users were doing before they left the home and an appearance of users when they left the home.

In other implementations, the sensors 222 may include motion sensors, pressure sensors, cameras or other sensors that determine occupancy and usage of appliances/features within the property. For example, in one instance, motion and temperature sensors may be placed on the walls within a room to determine if a person is currently occupying or not occupying the room. In another instance, the sensors 222 may be placed on particular objects and/or appliances to monitor user activity and user safety within a property. For example, touch sensors may be placed on common appliances such as, for e.g., an oven, a stove, a blender, a space heater, which may cause personal injuries to users. In some implementations, the sensors 222 within the property may collect user activity data based on proximity with the wearable devices 240 to track user movement within the property. In another example, the sensors 222 may only collect user activity data when the user is located within property based on location data transmitted from the wearable devices 240 indicating that the user is within a particular distance (e.g., 5 meters) from the sensors 222.

The one or more mobile devices 230 may be devices that host one or more native applications, e.g., the native control application 232. The mobile devices 230 may be similar to the authorized device 140 as described with respect to FIG. 1. The mobile devices 230 may be cellular phones or non-cellular locally networked devices. The mobile devices 230 may include a cell phone, a smart phone, a tablet PC, a personal digital assistant ("PDA"), or any other portable device configured to communicate over a network. For example, implementations also may include portable music players, other communication devices, and handheld or portable electronic devices for gaming, communications, and/or data organization. The mobile devices 230 may be the same or may include mobile devices of different types. The mobile devices 230 may perform functions unrelated to the monitoring platform 200, such as placing personal telephone calls, playing music, playing video, displaying pictures, browsing the Internet, maintaining an electronic calendar, etc.

In some implementations, the mobile devices 230 may communicate with and receive data from the monitoring control unit 210 using the communication link 228. For instance, the mobile devices 230 may communicate with the monitoring control unit 210 using various local wireless protocols, such as Wi-Fi, Bluetooth, Z-Wave, ZigBee, HomePlug (Ethernet over power line), or wired protocols such as Ethernet, USB, and other wired protocols based on the RS232, RS485, and/or RS422 standards. The mobile devices 230 may connect locally to the monitoring platform 200, its sensors, and other devices. The local connection may improve the speed of communications because communicating through the network 205 with a remote server, e.g., the application server 270, may be slower.

Although the mobile devices 230 are shown communicating with the monitoring control unit 210, the mobile devices 230 may communicate directly with the sensors 222, the appliances 224, the cameras 226, the wearable devices 240, the beacons 250, the drone devices 260, and other devices controlled by the monitoring control unit 210. In some implementations, the mobile devices 230 may replace the monitoring control unit 210 and perform the functions of the monitoring control unit 210 for local control and long range or offsite communication.

In other implementations, the mobile devices 230 may receive data captured by the monitoring control unit 210 through the network 205. The mobile devices 230 may receive the data from the monitoring control unit 210 through the network 205 or the application server 270 and may relay data received from the monitoring control unit 210 to the mobile devices 230 through the network 205. In this regard, the application server 270 may facilitate communications between the mobile devices 230 and the monitoring control unit 210.

Although the mobile devices 230 are shown in FIG. 2 as being connected to the network 205, in some implementations, the mobile devices 230 are not connected to the network 205. In these implementations, the mobile devices 230 may communicate directly with one or more of the monitoring platform 200 components and no network connection, e.g., connection to the Internet, or reliance on remote servers is needed.

In some implementations, a mobile device 230 may be able to determine a geographic location associated with the mobile device 230, and may communicate information identifying a geographic location associated with the mobile device 230 to the sensors 222 or the wearable devices 240. For example, a mobile device 230 may determine the current geographic location of the mobile device 230 by using global positioning system (GPS) capabilities. In other implementations, a geographic location associated with a mobile device 230 may be determined using other methods, for example, by using Wi-Fi access point triangulation data, cellular network triangulation data, or IP address information, when the mobile device 230 has network connectivity. The mobile device 230 may additionally or alternatively transmit data identifying the geographic location of the mobile device 230 over the network 205 to the application server 270, or to the monitoring control unit 210.

The mobile devices 230 may each include a native application 232 respectively, as represented more particularly in FIGS. 4-8. The native application 232 refers to a software/firmware program running on the corresponding mobile devices that enables the safety monitoring features described within this disclosure. The mobile devices 230 may load or install the native application 232 based on data received over a network or data received from local media. The native monitoring application 232 may run on mobile devices' platforms, such as Apple iOS, iPhone, iPod touch, Blackberry, Google Android, Windows Mobile, etc.

The native application 232 identifies and displays user data such as, for e.g., a geographic location associated with the mobile device 230 and communicates information identifying the geographic location to various devices within the monitoring platform 200 such the sensors 222, the wearable devices 240, or the monitoring control unit 210. In some instances, the native application 232 may also transmit user data to the application server 270. For example, a mobile device 230 having the native application 232 may determine a geographic location of the mobile device 230 using GPS capabilities, and may communicate data identifying the geographic location to the application server 270. In some instances, the native application 232 may check the location of the mobile device 230 periodically and may automatically detect when a user associated with the mobile device 230 is going toward or away from a property.

The wearable devices 240 may be portable electronic devices that may be incorporated into items of clothing and accessories worn by a user. The wearable devices 240 may be activity trackers, smartwatches, smart glasses, handhelds, bracelets, necklace pendants, or any wearable device configured to communicate over a network. The wearable devices 240 may include devices of different types. The wearable devices 240 may perform functions unrelated to the monitoring platform 200, such as monitoring user activity data such as, for e.g., biometric data, fitness data, sleep data, user-inputted data, and any other type of quantitative data.

In some implementations, the wearable devices 240 may include an integrated panic button that a user may push to have the wearable devices 240 transmit a distress signal indicating that the user requires emergency assistance to the application server 270 or an emergency responder, such as a 911 dispatch center.

In some implementations, the wearable devices 240 may include embedded sensors that measure various biometric data such as, for e.g., heart rate or rhythm, breathing rate, blood oxygen level, blood pressure, skin temperature, skin moisture. In some implementations, the wearable devices 240 may include hardware components such as an accelerometer, a gyroscope, a microphone, a camera, image sensors, video sensors, sound sensors, and/or an automated speech recognizer.

The wearable devices 240 may constantly monitor and process data transmitted between the components of the monitoring platform 200 such as, e.g., the monitoring control unit 210, the sensors 222, or the mobile devices 230.

In some implementations, the wearable devices 240 may function independently of the components of the monitoring platform 200 and include a separate network module that enables the wearable devices 240 to connect to the components of the monitoring platform 200 by exchanging wireless communications over the network 205. For instance, the wearable devices 240 may include one or more GSM modules, a radio modem, a cellular transmission mode, or any type of module configured to exchange communications in the following formats: LTE, GSM or GPRS, CDMA, EDGE, EGPRS, EV-DO or EVDO, UMTS, or IP. In other instances, the wearable devices may be capable of using various local wireless protocols, such as Wi-Fi, ANT, Bluetooth, Z-Wave, ZigBee, HomePlug (Ethernet over powerline), or wired protocols such as Ethernet, USB, and other wired protocols based on the RS232, RS485, and/or RS422 standards. For example, the wearable devices 240 may transmit measured data to the mobile devices 230 over a local wireless protocol and the mobile devices 230 may then transmit the data received by the wearable devices 240 to the application server 270.

The one or more wireless sensor beacons 250 can be devices capable of emitting and/or receiving information over a wireless communication channel. For example, the wireless sensor beacons 250 may utilize Bluetooth Low Energy (BLE), also known as Bluetooth Smart, or other wireless technologies such as, for e.g., Wi-Fi, near-field communications (NFC), or other wireless technologies, to communicate with the devices connected over the network 205. The wireless sensor beacons 250 may be commercially available beacon devices or other types of beacon devices. The wireless sensor beacons 250 may communicate with the devices of the monitoring platform 205 by emitting messages (e.g., pings) that include information identifying the wireless sensor beacons 250.

In some implementations, devices of the monitoring platform 200 such as the mobile devices 230, and the wearable devices 240 may communicate with the wireless sensor beacons 250 by receiving message from the one or more wireless sensor beacons 250 identifying one or more of the wireless sensor beacons 250. For example, each of the one or more wireless sensor beacons 250 may be associated with a unique universal identifier (UUID) that identifies a particular wireless sensor beacon within a group of two or more wireless sensor beacons within a particular geographic location, for e.g., a shopping complex.

In some implementations, a particular wireless sensor beacon 250 may be associated with particular regions within a geographic location, for e.g., particular floors or individual shops within a shopping complex, to monitor user data by exchanging communications with nearby one or more mobile devices 230, 140 or wearable devices 240. For example, one or more wireless sensor beacons 250 may be placed within multiple floors of a shopping complex, each with different UUIDs and a particular set of latitude and longitude coordinates that are associated with a defined region (e.g., a section within a store, an outdoor area, a building, a venue or other space).

Each of the one or more wireless sensor beacons 250 may broadcast information to allow the devices of the monitoring platform 200 to recognize the one or more of the wireless sensor beacons 250. In some instances, the one or more wireless sensor beacons 250 broadcast their information periodically for particular periods of time (e.g., every second, every millisecond). The one or more wireless sensor beacons 250 may broadcast this information using wireless communications protocols such as, for e.g., BLE. In some implementations, information broadcasted by the one or more wireless sensor beacons 250 may also be broadcasted on particular frequencies or power levels to control the types of devices on the monitoring platform 200 that receive the information. For example, the one or more wireless sensor beacons 250 may transmit information to the mobile devices 230 and the wearable devices 240, on different frequencies, respectively.

In some implementations, the one or more wireless sensor beacons 250 may be placed in common regions that experience high user traffic volumes such as, for e.g., a public park, a tourist attraction, a public transportation station, a commercial complex, or other types of highly populated locations. In such implementations, the one or more wireless sensor beacons 250 may be configured with third-party electronic transportation or safety platforms to transmit information to the devices connected to the monitoring platform 200. For example, the one or more wireless sensor beacons 250 may detect a hazardous condition on a subway line based on receiving safety signals from the transportation authority and in response, transmit this information to the mobile devices 230 or the wearable devices 240.

In some implementations, the one or more wireless sensor beacons 250 may be configured to operate with a particular mobile application that is installed on the devices connected to the monitoring platform 200. For example, the particular mobile application may include a software development kit (SDK) that enables the devices connected to the monitoring platform to exchange communications with the one or more wireless sensor beacons 250. For instance, the different devices connected to the monitoring platform 200 may independently exchange communications with the one or more wireless sensor beacons 250. In such instances, a wearable device 240 may be able to transmit a distress signal including user data to the one or more wireless sensor beacons without the user having his/her mobile device with him. In other instances, the one or more wireless beacons 250 may receive redundant signal transmissions from the different devices connected to the monitoring platform 200 to ensure that distress signal is adequately transmitted to the application server 270 when one or more of the devices connected to the monitoring platform 200 malfunctions. For example, if a user is involved in a car crash that destroys his/her wearable device and mobile device, the monitoring platform 200 may determine that these devices are unable to transmit the distress signal and instead transmit a distress signal including cached data stored on other devices connected to the monitoring platform 200 such as the one or more wireless sensor beacon 250 or the drone devices 260.

In some implementations, the one or more wireless sensor beacons 250 may be connected to emergency call booths that enable the one or more wireless sensor beacons 250 to identify devices within a particular distance (e.g., 30 meters) when the devices transmit a distress signal to the monitoring platform 200. For example, the emergency call booths may monitor a particular frequency that includes the frequency of the outgoing distress signals transmitted by nearby devices. In response to detecting that a nearby device has transmitted a distress signal within a particular time period (e.g., 5 minutes), the particular wireless sensor beacon 250 that is connected to the emergency call may then transmit a signal including location information to the application server 270 or to an emergency responder, such as a fire department dispatch center.

The drone devices 260 may be unmanned devices that are capable of movement. For example, the drone devices 260 may be capable of moving throughout a location based on automated control technology and/or user input control provided by either the user or by the devices connected to the monitoring platform 200. In this example, the drone devices 260 may be able to fly, roll, walk, or otherwise move about a location. The drone devices 260 may include helicopter type devices (e.g., quad copters), rolling helicopter type devices (e.g., roller copter devices that can fly and also roll along the grounds, walls, or ceiling), land vehicle type devices (e.g., automated cars that drive around a property), and plane type devices (e.g., unmanned aircraft).

In some implementations, the drone devices 260 may be dispatched in response to an incident signal indicating that a user may require emergency assistance. For example, if a user has been injured during a known running route, the wearable device 240 may transmit data to the application server 270 from which the application server 270 may determine there is a likely safety incident, and in response, transmit an incident signal and a location of the user to an emergency responder and also transmit a dispatch instruction with the user location to the drone devices 260. The application server 270 may determine the location of the user during an incident based on comparing current data collected by the sensors 222, one or more mobile devices 230, 140, the wearable device 240, or the one or more wireless sensor beacons 250 to historical information about the user or user activity. In such examples, the monitoring platform 200 may deploy the drone devices 260 to the determined location. In some instances, the drone devices 260 may be equipped with a broadband connection that allows the drone devices 260 to connect with the network 205.

In some implementations, the drone devices 260 may include data capture and recording devices. In some instance, the drone devices 260 may include one or more cameras, one or more motion sensors, one or more microphones, one or more biometric collection tools, one or more temperature sensors, one or more humidity sensors, one or more airflow sensors, and/or other types of sensors that may be useful in capturing monitoring data related to user safety. For example, once dispatched to a location where the user may require emergency assistance, the drone devices 260 may capture a video feed of the user showing the extent of injury and transmit the video feed to either the application server 270 or directly to an emergency responder to alert them about the user's condition. In other examples, the drone devices 260 may be outfitted with thermal-imaging cameras capable of identifying locations, people, or pets through structural features of a location. For example, the drone devices 260 may be deployed to a property in which a user is located and may use the thermal-imaging cameras to determine a particular location within the property where the user may be trapped inside the property. In such examples, the drone devices 260 may transmit the captured thermal video footage to an emergency responder, such as a nearby fire station.

In some implementations, the drone devices 260 may also include output devices. In such implementations, the drone devices 260 may include one or more displays, one or more speakers, one or more projectors, and/or any type of output devices that allow the drone devices 260 to communicate information to nearby emergency contacts. For example, if a user is physically disabled as the result of an incident and unable to use wearable devices 240 or mobile devices, the user may record a distress message or video using the drone devices 260, which may then transmit the message or video to the application server 270.

In some implementations, the drone devices 260 may be configured to record visual verifications and/or identify perpetrator identification for particular types of incidents. For example, in response to safety incidents determined by the application server 270, the application server 270 may deploy the drone devices 260 to record video footage. In some instances, the drone devices 260 may be configured to operate within certain geographic regions (e.g., a gated residential community). The drone devices 260 may be centrally operated by a security provider such as an alarm security company providing security services to a particular geographic region. In such instances, the drone devices 260 may be stored in a central home base with a charging and control station and deployed as a mobile solution in response to an incident signals for users.

In some implementations, the drone devices 260 may be delivery drones (e.g., a parcelcopter) that may be utilized by the monitoring platform 200 to provide supplies or other equipment to a user in response to the application server 270 detecting the occurrence of an incident. For instance, the drone devices 260 that are delivery drones may be used to dispatch first aid kits and/or other emergency medical equipment (e.g., gauze, bandages, braces, epi pens, tourniquets, etc.). In such instances, the drone devices 260 may delivery particular supplies based on the classification of the incident by the application server 270.

In some implementations, after the application server 270 determines an incident, the application server 270 may select the particular drone device 260 to deploy to the incident from a set of drone devices 260 based on particular attributes such as, for e.g., charge levels, location of the incident, and the direction of user movement. For example, the set of drone devices 260 may include various drone devices 260 with varying battery capacities, aerial speeds, and/or device features. In such examples, the monitoring platform 200 may choose the particular drone device 260 to be deployed that can get to the location of the incident the fastest and has enough battery to monitor the user for a reasonable amount of time (e.g., fifteen minutes).

In some implementations, multiple drone devices from the set of drone devices 260 may be deployed based on the particular nature of the safety incident. For example, the application server 270 may deploy multiple drone devices if the received user data indicates the safety incident is a life-critical incident (e.g., a house fire) that causes a loss of life. In some instances, the multiple drone devices may be deployed sequentially to maximize response time and conserve resources. For example, the multiple drones may include a diagnostic drone device, which is deployed initially to minimize response time, and a support drone device that provide the user with emergency supplies to help with the emergency event. In another example, an initial drone device may be deployed to minimize response time while a secondary drone is deployed as a backup if the battery of the initial drone runs out.

The application server 270 may be an electronic device configured to process data from the monitoring control unit 210. In some implementations, the application server may include a distributed processing platform, a cloud computing system, or a remote computing server. In some examples, the application server 270 is similar to the property management server 130 as described with respect to FIG. 1. For example, the application server 270 may determine from received sensor data whether the user is injured or in danger. To make the determination, the application server 270 may provide control services by exchanging electronic communications with the monitoring control unit 210 and the mobile devices 230 over the network 205. For example, the application server 270 may be configured to monitor user data generated by the devices connected to the monitoring platform 200 such as the sensors 222, the mobile devices 230, the wearable devices 240, the one or more wireless sensor beacons 250, and the drone devices 260. In this example, the application server 270 may exchange electronic communications over the network 205 to send and/or receive information regarding user activity such as biometric data, activity data, location data and health data. The application server 270 also may receive information regarding activity within or external to the property from the mobile devices 230 or the wearable devices 240.

In some implementations, the application server 270 may store a user profile with user data transmitted from the devices connected to the monitoring platform 200. For instance, the devices connected to the monitoring platform 200 may periodically transmit various types of user data to the application server 270. The application server 270 may aggregate the different types of user data such as personal data, biometric data, activity data, and historical data into a user profile. In some instances, the application server 270 may use the user profile to learn normal usage patterns such as activity patterns (e.g., common exercise routines) and normal biometric measurements (e.g., resting heart rate, baseline blood pressure, normal skin temperature, baseline breathing rate). For example, the application server 270 may periodically receive user data collected by the devices connected to the monitoring platform 200 such as, for e.g., the mobile devices 230, or the wearable devices 240, and log the user data into the user profile. The application server 270 may then aggregate the received user data over particular time periods (e.g., six months) and perform trend analyses to determine normal biometric measurements for the user. In another example, the application server 270 may receive user activity data (e.g., steps taken, calories burnt) and compare the activity data with location data to determine usage patterns such as exercise locations, exercise routines, and other activity patterns.

In some implementations, the application server 270 may determine incidents and generate incident reports indicating that a user requires emergency assistance. For example, an incident may be any type of safety incident that is detected by the application server 270 based on the user data collected by the devices of the monitoring platform 200. For example, the application server 270 may determine that a user may be having a heart attack based on the particular wearable device 240 that measures heart rate data that the current heart rate is too high compared to a reference measurement. In response, the application server 270 may transmit an incident report to an emergency responder, such as an ambulance dispatch center, that includes various types of user data such as, for e.g., heart rate measurements, user activity data indicating prior physical activity, historical measurements of heart rates hours prior to the incident.

In another example, the application server 270 may determine from received sensor data that a user was running along a trip route saved in a user's profile and mid-way between the route, the user's breathing pattern and heart rate corresponded to those when the user is unconscious or asleep and that the user is still moving. In response, the application server 270 may determine that there is a safety issue. For example, the application server 270 may determine from data from cameras 226 that the user may have been kidnapped. If the application server's 270 confidence that the user has been kidnapped is high, the application server 270 may immediately notify emergency personnel. If the application server's 270 confidence that the user has been kidnapped is moderate, the application server 270 may display a prompt and an audio alert on the user's mobile device, wearable device or heads up display indicating that the application server 270 has determined that the user may be in danger and how the application server 270 made the determination, and a countdown indicating that emergency personnel will be notified if the user does not verify that there is no safety issue within a specific period of time (e.g., thirty seconds). The application server 270 may require that the user enter a passcode on the user's mobile device to verify that no notification should be made.

In some instances, the application server 270 may be configured to determine particular duress codes sent by the user in the event of an emergency incident. For instance, the user may enter a pre-determined or customized duress code it appears as if the user has cancelled the alarm but actually transmits a duress signal to the application server 270. For example, the user may enter the duress code during a robbery.

In yet another example, the application server 270 may receive an indication that a user has activated a panic button on a necklace worn by the user, sensor data indicating that the user was traveling at a high speed corresponding to a car and is no longer moving, and sensor data indicating that the user's car airbags have deployed. In response, the application server 270 may determine that the user has been in a car accident and is seriously injured and may notify emergency personnel accordingly.

In some instances, the application server 270 may monitor the user location of the user when he/she is close to or inside the property to determine how to process an incident signal. For example, if the user is involved in an incident outside the property, the application server 270 may transmit the incident signal to emergency responders and if the user is involved in an incident inside the property, the application server 270 may instruct the monitoring control unit 210 to transmit the incident signal to the home security provider for the home.

In some implementations, the application server 270 may determine the occurrence of an incident based on comparing extrinsic data surrounding the user location and the user data collected by the devices connected to the monitoring platform 200. For instance, the application server 270 may monitor current weather, daylight level, air quality, and/or other external conditions to determine whether the user data indicates suspicious conditions. For example, if the current weather indicates a thunderstorm, then the application server 270 may determine that the user location indicating that the user is stationary outside may be suspicious, e.g., the user may have been struck by lightning or the user is being forced to stay stationary outside. In another example, if it is night time, the application server 270 may determine that the user is more likely to be performing night time activities, e.g., stargazing, walking, jogging as opposed to football or basketball, and determine whether there is likely to be a safety incident based on the types of night time activities in which the user might have been engaged. In yet another example, if it is night time but the user data indicates that the user is currently performing activities outside that are better suited for sunlight, e.g., football or basketball, the monitoring platform 200 may also determine that this may be suspicious. In another example, if the user medical history in the application server 270 indicates that the user may have asthma but that the user is located in an area with low air quality, the application server 270 may predict that the user may likely have an asthma attack or may determine that the user is likely suffering an asthma attack.

In some implementations, the application server 270 may aggregate user data collected by devices of multiple users that are all connected to the monitoring platform 200 to gather data surrounding mass casualty incidents. For example, if there is a large-scale emergency within a particular location (e.g., earthquake, terror attack, public evacuation, etc.), the application server 270 may determine the presence of such an emergency based on aggregating suspicious data from multiple devices within the particular location. The application server 270 may compare the aggregated data to other types of environmental data (e.g., seismic activity, electromagnetic pulses, or radiation) that are be collected from sensors located nearby or within the particular location where there may be abnormal activity.

In some implementations, the monitoring platform 200 may additionally or alternatively include various features. For example, the monitoring platform 200 may include a peer-to-peer location sharing feature that enables users to send location information collected from the mobile devices 230 or the wearable devices 240 to emergency contacts. In another example, the monitoring platform 200 may include a distress signal forwarding feature that enables a user to transmit a distress signal including user location information from either the mobile devices 230 or the wearable devices 240 to an emergency responder such as, for example, a fire station, an emergency medical services facility, or a police station. In another example, the monitoring platform 200 may include mobile applications that use the location data collected by the mobile devices 230 and the wearable devices 240 to determine the nearby authorities having jurisdiction (AHJ) or the public safety access points (PSAP) in case of an emergency incident within the user location.

The monitoring platform 200 as described within this disclosure may be adapted to function with a variety of wearable devices, communication devices, and networks with long-term extensibility. For example, new wearable devices and applications may be adapted to operate with the monitoring platform 200 by adapting the new wearable devices to run mobile applications that are capable of exchanging communications with the devices connected to the monitoring platform 200. In some instances, the monitoring platform 200 may include a mobile application ecosystem that includes customized mobile applications that are built for particular mobile devices, wearable devices, communication devices, safety sensors, drone devices, and wireless sensor beacons such that these devices may exchange communications over the network 205 with emergency responders. For instance, particular examples of wearables device may include a smart motorcycle helmet or a smart skiing helmet that can transmit speed and crash information to emergency medical responders, including the location on the helmet of the impact(s) and the number of impacts(s). In another instance, vehicles such as cars, motorcycles, and public transportation may include smart sensors that transmit distress signals to nearby emergency responders in response to a vehicular crash. In other instances, wearable devices may include miniaturized personal health devices used to monitor the movement of patients with chronic diseases such as, for e.g., Parkinson's disease.

Figure 3:
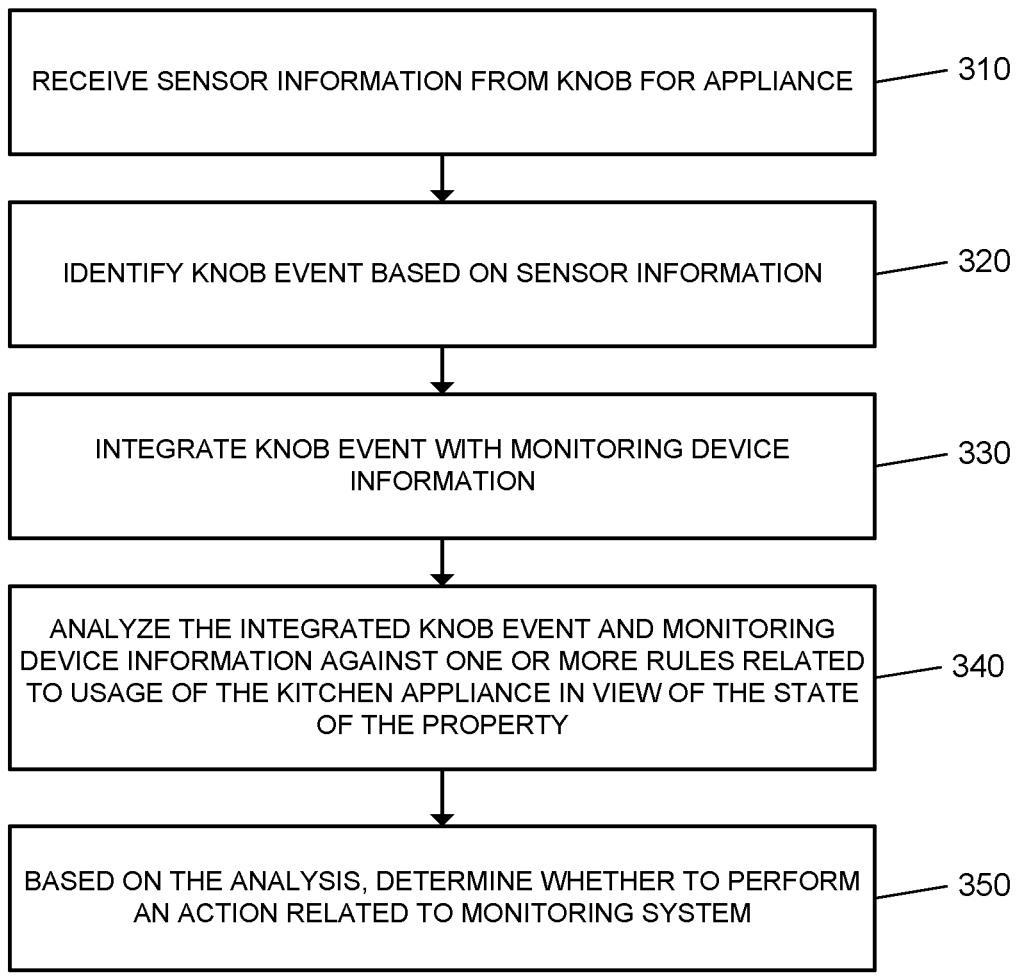
FIG. 3 is a flow chart of an example process of integrating sensor data collected from a knob for an appliance with property monitoring data.

FIG. 3 illustrates an example of a process 300 of integrating sensor data collected from a knob for an appliance with property monitoring technology. Briefly, the process 300 may include receiving sensor information from a knob for an appliance (310), identifying a knob event based on the received sensor information (320), integrating the knob event with monitoring device information (330), analyzing the integrated knob and monitoring device information by comparing the integrated data against one or more rules related to the usage of the appliance in view of the state of the property (340), and, based on the analysis, determining whether to perform an action related to the monitoring system (350).

In more detail, the process 300 includes receiving sensor information from a knob for an appliance (310). In some examples, the systems 100 and 200 can perform the process 300. For example, the property management server 130 can receive sensor information from the knob for the appliance 126. In some examples, the server 130 can receive the data through the monitoring control unit 110. In some examples, the server 130 may receive the data directly from the knob for the appliance 126.

In some examples, the appliance 126 has two or more knobs. For example, the appliance 126 can be an outdoor grill with two burners, a stove with four burners, etc., and each burner controlled by an independently operated knob. In some examples, each independently operated knob includes an independent sensor. In some examples, the server 130 can group data received from the knob for the appliance 126. For example, if the stove 126 includes multiple independently operated knobs with independent sensors that each transmit data to the server 130, the server can group the data received from each of the knobs associated with the stove 126 together and analyze the data together.

In some examples, if a user would like to treat data from each of the independent knob sensors for the stove 126 separately, the server 130 can analyze data from each of the independent knob sensors individually. For example, the server 130 can determine from data received from the individual knobs for the stove 126 that three of the four burners are on. In some examples, the server 130 can determine which burners are on.

The process 300 may include identifying a knob event based on the received sensor information (320). For example, the server 130 can receive data from the knob for the appliance 126 through the monitoring control unit 110 and process the data to determine that a knob event has occurred. Knob events may include events such as appliance on, appliance off, position of knob, temperature of knob, particulate level (e.g., a gas or smoke detector), motion detected, etc.

The process 300 may include integrating the knob event with monitoring device information (330). For example, the server 130 can receive monitoring device information from the monitoring control unit 110. The monitoring system data can include data from devices such as the cameras 120, the sensors 122, other appliances 124, and other devices and systems under the purview of the monitoring system for the property 101.

The process 300 may include analyzing the integrated knob and monitoring device information and comparing the integrated data against one or more rules related to the usage of the appliance in view of the state of the property (340). For example, the server 130 can receive data from the cameras 120 and analyze the images to determine that a pan is over the rear right burner. In some examples, the server 130 may determine from the knob event data received from the knob for the appliance 126 through the monitoring control unit 110 that the front right burner is on.

In some examples, the server 130 can receive data from the cameras 120 and analyze the images to determine that a pet or a child triggered the Appliance On event detected by the knob for the appliance 126. In some examples, the server 130 can receive data from the sensors 122 to determine that no one has been detected near the stove 126 for 20 minutes and determine from data received from the knob for the appliance 126 that that stove 126 is still on. In some examples, the server 130 can determine from data received from the sensors 122 that no one is detected in the house after Door Open and Door Close events occurred an hour ago, and that the stove 126 is still On—High. In some examples, the server 130 can determine the occupancy of the property 101 from the status of the security system. For example, the server 130 can determine that no one is home because the security system is armed, but that the stove 126 is still on and there is a Smoke Detected event.

In some implementations, the server 130 can analyze image or video data received from the cameras 120 to determine a state of the appliance 126. For example, the server 130 may receive image data of the appliance 126. In this particular example, the appliance 126 may be a dishwasher that has an indicator light. The image data from the cameras 120 can be analyzed to determine whether the dishwasher 126 has finished its cycle based on the status of the indicator light. For example, if the image data from the cameras 120 indicates that the indicator light of the dishwasher 126 is green, the server 130 may determine that the dishwasher 126 has finished its cycle. In some examples, the image data from the cameras 120 may show a countdown timer on an appliance 126. For example, the appliance 126 may be a washing machine that displays a countdown timer of the time remaining in the wash cycle. The server 130 may analyze the image data from the cameras 120 to determine that the countdown timer on the washing machine 126 displays the number "12." The server 130 may determine that the washing machine 126 has 12 minutes left until it completes its wash cycle.

In some implementations, the server 130 can analyze audio data received from the sensors 122 to determine a state of the appliance 126. For example, the server 130 may receive audio data of the appliance 126. In this particular example, the appliance 126 may be a toaster. The server 130 may analyze the audio data received from the sensors 122 to determine whether the toaster 126 has finished toasting a piece of bread based on detecting an audio pattern that is associated with the toaster 126 ejecting the toasted bread. For example, if the audio data from the sensors 122 indicate a period of low noise and then a short pattern of noise associated with the toaster 126 ejecting the toasted bread, the server 130 may determine that the toaster 126 has finished toasting the bread.

In some examples, the server 130 may use techniques such as machine learning to analyze data received from the cameras 120, the sensors 122, etc. For example, the server 130 may use any of a variety of models such as decision trees, linear regression, neural networks, Bayesian networks, etc., and can be trained using a variety of approaches, such as deep learning, inductive logic, support vector machines, clustering, etc.

In some examples, the server 130 can analyze IR data received from the sensors 122 to detect motion in the property 101 and determine whether someone is in the vicinity of the stove 126 while it is on. In some examples, the knob for the appliance 126 includes an IR sensor. In some examples, the server 130 can analyze IR data received from the sensors 122 to determine a state of the appliance 126. For example, if the appliance 126 is prone to overheating, the server 130 may determine, from IR data received from the sensors 122, that the appliance 126 needs to be serviced.

In some examples, the server 130 can use pattern recognition and historical data to determine that an abnormal event has occurred. For example, the server 130 can determine that, based on the past year's events, the stove 126 is not usually on at 2 p.m. on a Tuesday. In some examples, the server 130 can determine, at 6:15 p.m. on Thursday, that the stove 126 is usually on by 5:30 p.m. on weekdays, that the usual people are in the property 101, and that the stove 126 has not been turned on yet. In some examples, the server 130 can determine from the knob event data received from the knob for the appliance 126 that the stove 126 was left on for too long. For example, the server 130 can receive temperature, smoke, etc. data from the knob for the appliance 126 and determine that the stove 126 has been on for too long.

In some examples, the system 100 or 200 is used in a commercial or industrial setting. For example, the server 130 can receive data from the knob for the appliance 126 that a griddle 126 in a restaurant 101 has not been turned on yet. Based on historical data for the restaurant 101, the server 130 can determine that the griddle 126 will not be hot enough to prepare food on when the first customers arrive. In some examples, the server 130 can determine that an abnormal event has occurred based on the time of day the event, or lack of an event, has occurred. For example, if the griddle 126 has not been turned on by 5 a.m., and the restaurant opens at 6 a.m., the server 130 can determine that an abnormal Griddle Off event has occurred.

In some examples, the system 100 or 200 is used in a community setting. For example, the server 130 can determine, in an assisted living center, that a resident usually turns on their stove 126 at 7 a.m. to make breakfast, and that the resident has not turned on their stove 126.

The process 300 may include determining whether to perform an action related to the monitoring system based on the analysis performed (350). For example, the server 130 can transmit a notification to a user who has not turned on their stove 126 by a certain time reminding them to start making dinner. In some examples, the server 130 may transmit a notification to a user who has not unloaded their washing machine within a certain number of hours of the washing machine finishing its cycle, reminding them to unload the washing machine. In some examples, when the system 100 or 200 is used in a community setting, the server 130 can transmit a notification to an authorized user 104 or authorized device 140 to check on a resident who has not turned on the stove 126 by a predetermined amount of time after their routine cooking time.

In some examples, the server 130 may transmit a notification to an authorized device 140 that is a smart speaker or an electronic home assistant. The notification may prompt the authorized device 140 to audibly query the user. For instance, the authorized device 140 may audibly ask the user 102 or 104 if they would like to set a timer or dim the lights.

In some examples, if the electric stove 126 was left on when the power went out, the server 130 can determine, based on data received from remote sources or from the monitoring control unit 110, that power is out or that the power was out and has been restored, and, from data received from the knob for the appliance 126, that the stove 126 is still on. In this example, the server 130 may send a notification to an authorized device 140 indicating that the stove 126 is still on, or the server 130 can transmit instructions to the monitoring control unit 110 to turn off the stove 126.

In some examples, the server 130 can monitor power usage of the stove 126 based on data received from the knob for the appliance 126 and the monitoring control unit. For example, the server 130 can calculate the power draw of the stove 126 relative to the position of the knob for the appliance 126.

In some examples, the server 130 can transmit instructions to the monitoring control unit 110 to operate other systems and devices in the property 101. For example, the server 130 can receive data from the knob for the appliance 126 indicating that the stove has been turned on. In this example, the individual detected near the stove 126 may be returning from a vacation, and may not have adjusted their HVAC system settings from an unoccupied setting to their preferred setting. The server 130 may transmit instructions to the monitoring control unit 110 to adjust settings for the HVAC system of the property 101.

In some examples, the server 130 may use facial recognition to determine which user 102 has been detected near the stove 126. For example, the server 130 may use facial recognition on image data received from the cameras 120. In some examples, the server 130 may use location data (e.g., GPS data) to determine occupancy of the property 101. For example, the server 130 may use location data from a mobile device associated with the user 102 to determine that the user 102 is within a predetermined range of the stove 126 or that the user 102 is not present in the property 101. In some examples, the server 130 may use location data from one or more mobile device associated with known occupants to determine that none of the known occupants are present in the property 101. In some examples, the server 130 may use network data from the network 105 to determine occupancy of the property 101. For example, the server 130 may receive connectivity data from the network 105 indicating that a user 102 is in the property 101 or that no users are in the property 101.

In some examples, the server 130 can determine, using the available actions 132 that an alert should be sent to an authorized device 140. For example, the server 130 may receive data from the knob for the appliance 126 indicating that the stove 126 was turned on. In some examples, the available actions 132 are determined automatically by the server 130. In some examples, the available actions 132 are set by an authorized user 104. In some examples, the available actions 132 are determined by an operator of the server 130 or the systems 100 or 200.

The server 130 can filter the available actions 132 based on data received from the knob for the appliance 126, the monitoring control unit 110, or other remote sources. For example, the server 130 can determine that several available actions 132 are not to be performed when the authorized device 140 is detected proximate to the stove 126. In some examples, the server 130 can determine that a notification is not necessary when the knob for the appliance 126 detects a Stove On event if the authorized device 140 is within the detectable region 128.

The server 130 can determine that certain actions are to be performed, such as presenting a user 102 or 104 with a prompt requesting input. For example, the server 130 can receive data from the knob for the appliance 126 indicating that the stove 126 has been turned on. The server 130 can present a prompt to the user 102 asking whether the user 102 would like to set a timer. In some examples, the server 130 can receive image data from the cameras 120 that provide details of the user 102's actions. For example, if the user 102 is making pasta, the server 130 may determine the appropriate amount of time for the type and amount of pasta the user 102 is making, and provide a prompt suggesting that the user 102 set a timer for four minutes.

In some examples, the server 130 can receive image data from the cameras 120 that provide details of the user 102's actions and may revise the available actions 132. For example, the server 130 may transmit a prompt to the user 102 asking whether they would like to open a recipe for chicken after determining from the image data from the cameras 120 that the user 102 has put a chicken breast in the pan. In some examples, the server 130 may transmit a prompt to the user 102 asking whether they would like to put on music over the kitchen speakers when the server 130 receives data from the knob for the appliance 126 indicating that the stove 126 has been turned on.

In some examples, the server 130 can automatically transmit instructions to the monitoring control unit 110 to perform actions related to the monitoring system for the property 101. For example, the server 130 can automatically turn off a timer if the stove 126 is turned off to prevent disturbing the user 102 after they are finished using the stove 126. In some examples, the server 130 can transmit instructions for adjusting a timer based on activity within the property 101 detected by the monitoring system. For example, if it is early in the morning, full occupancy of the property 101 is detected by the sensors 122, and there is no motion detected (e.g., everyone is asleep), when the server 130 receives data from the knob for the appliance 126 that the stove 126 is on, the server 130 may mute an automatic timer. In some examples, the server 130 can transmit instructions to control the authorized device 140. For example, the server 130 may be able to transmit instructions to control a smartphone 140.

In some examples, the server 130 can automatically transmit instructions to the monitoring control unit to operate other appliances 124 when a knob event is detected in data transmitted by the knob for the appliance 126. For example, the server 130 can automatically turn on an exhaust fan near the stove 126 when the knob for the appliance 126 transmits data indicating that a threshold of smoke particles detected has been surpassed. In another example, the server 130 can alert the user 102 when a pan placed on the stove 126 has been pre-heated based on the position of the knob received from the knob for the appliance 126. In some examples, the server 130 can retrieve preferences for a particular user and use those preferences to perform the action related to the monitoring system. For example, the server 130 can determine, based on image data from the cameras 120 and location data from the authorized device 140, that Jeff is using the stove 126. The server 130 can access Jeff's preferences, and can automatically transmit instructions to the monitoring control unit 110 to turn on the 90's East Coast rap station and to turn on every light in the kitchen when the server 130 receives data from the knob for the appliance 126 indicating that the stove 126 is on.

In some examples, the server 130 may determine where in the property to target an alert or notification. For example, the server 130 may determine based on data received from the monitoring control unit 110, the authorized device 140, or various other devices, that the user 102 has moved to the second floor study of the property 101. The server 130 may access the user 102's preferences and determine that the user is hard of hearing. The server 130 may then adjust the available actions 132 to an accessibility mode. In some examples, the server 130 may flash the lights in the second floor study of the property 101 to alert the user 102 that the stove 126 has been pre-heated. In some examples, the server 130 may receive data from the sensors 122 that it is too loud in a particular room of the property 101 to play an audio notification, so the server 130 may transmit instructions to the monitoring control unit to flash the lights in that room or transmit the notifications to the authorized device 140 of a user.

Figure 4:
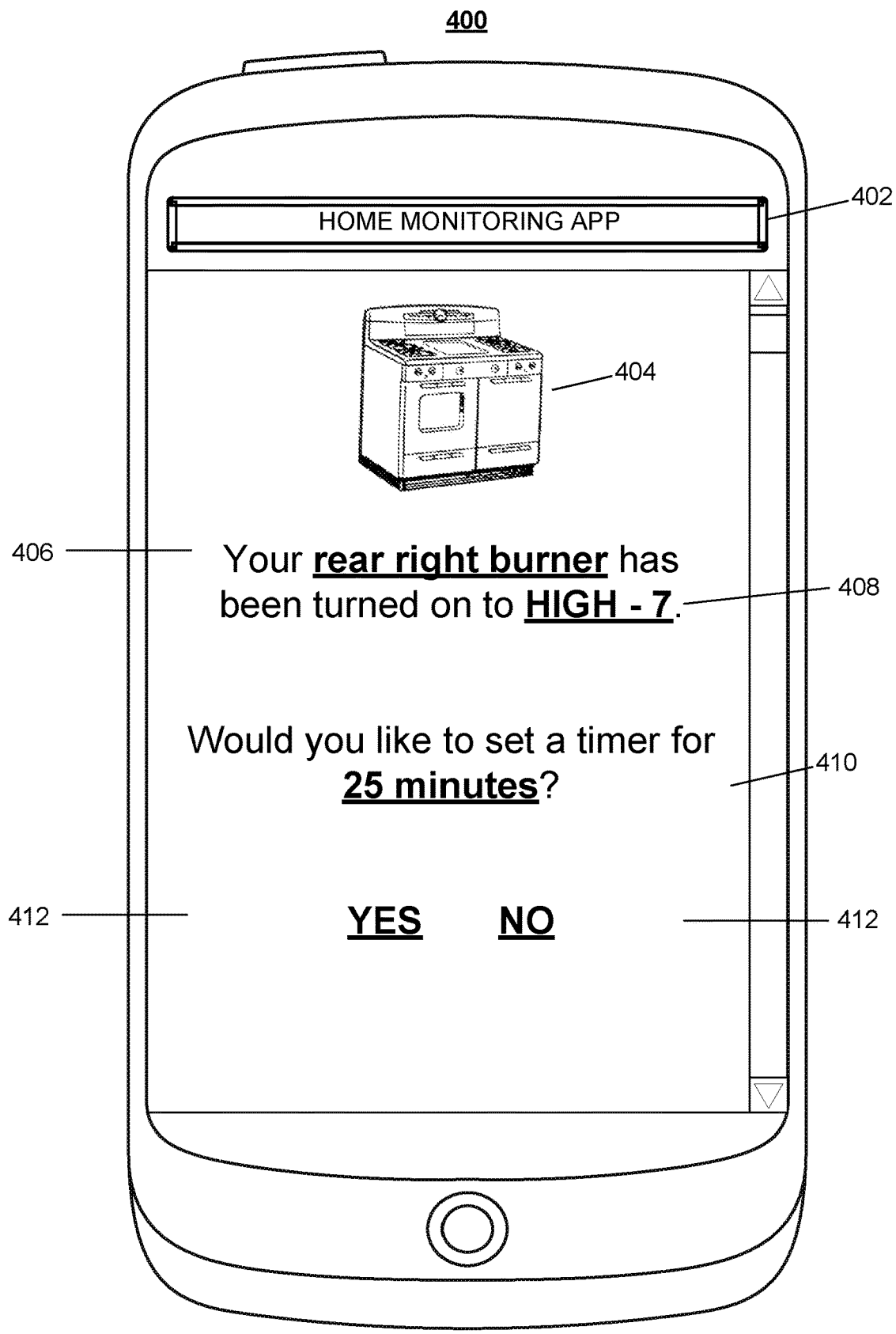
FIGS. 4-8 illustrate example interfaces for integrating sensor data collected from a knob for an appliance with property monitoring data.

FIG. 4 illustrates a diagram of an example interface 400 of a home monitoring application that integrates sensor data collected from a knob for an appliance with property monitoring technology. In some examples, the interface 400 is associated with the native control application 232 as described with respect to FIG. 2. The interface 400 includes a title 402, photo 404, appliance status information 406 and 408, a suggested setting 410, and user input elements 412. In some examples, the interface 400 is used by the user 102 or 104 to interact with the systems 100 or 200 as described with respect to FIGS. 1-2. The title 402 provides information about the interface 400 and lets a user know what app they are using. For example, a user may be redirected from a website to the interface 400. The interface 400 may be various kinds of interfaces. In some examples, the interface 400 may be an application. In some examples, the interface 400 may be a website or a web application.

The photo 404 provides visual information about the appliance associated with the selected knob sensor. In some examples, the photo 404 may be uploaded by the user while using the interface 400. For example a user may be asked by the interface 400 to provide a photo of the appliance they are using. In some examples, the user may be able to upload a photo through an application on the mobile device 140. The user may be able to upload the photo 404 through various methods, such as through a personal computer, through a link to a photo hosted on the Internet, etc. In some examples, the user may be able to edit or delete the photo 404 by selecting the photo 404. For example, the photo 404 may be a hyperlink to the hosted photo, may redirect the user to a photo editing interface, etc.

The appliance status information 406, 408 provides the user with information about the appliance. In this particular example, the particular burner 406 and the status of the burner 408 is shown. The appliance status information 406, 408 may include more information, such as the name of the appliance, the location of the appliance, etc. The appliance status information 406, 408 may include less information, such as only providing the particular burner 406.

The suggested setting 410 provides a setting suggested by the server 130. In this particular example, the suggested setting is for an amount of time to set a timer. In some examples, the suggested setting may be a brightness of lights, a power level of an exhaust fan, a volume of an alert, etc.

The user input elements 412 allow a user to provide input to the systems 100 or 200. In this particular example, the user input elements 412 are selectable options to either accept or rejected the suggested setting 410 provided by the server 130. In some examples, the user input elements 412 may be various elements, such as check boxes, radio buttons, links, text boxes, drop down menus, etc.

In some examples, the appliance status information 406, 408, the suggested setting 410, and the user input elements 412 are displayed in a visually different way from the rest of the information on the interface 400. For example, the appliance status information 406, 408, the suggested setting 410, and the user input elements 412 may be displayed in a different font, bolded, italicized, different font size, different color, etc. In some examples the user is able to select the visually different elements of the appliance status information 406, 408, the suggested setting 410, and the user input elements 412. Selecting elements of the appliance status information 406, 408, the suggested setting 410, and the user input elements 412 may perform an action dependent on the selection. For example, a user may be able to select the suggested setting 410 to change the setting. One or more elements of the appliance status information 406, 408, the suggested setting 410, and the user input elements 412 may be selectable or changeable.

In this particular example, the server 130 has prompted the user to set a timer through the interface 400. In some examples, when the server 130 receives data from the knob for the appliance 126 indicating a Gas Detected or Smoke Detected event, the server 130 may provide the user with an alert informing the user of the event. In some examples, when the server 130 receives data from the knob for the appliance 126 that a temperature of the knob associated with the appliance 126 is high, the server 130 may determine that an oven proximate to the stove 126 is on, and may transmit a notification to the user informing them of the event. In some examples, when the server 130 receives data from the sensors 122 that a light on the stove 126 was left on after the stove 126 was turned off, the server 130 may transmit instructions to the monitoring control unit 110 to turn off the light.

Figure 5:
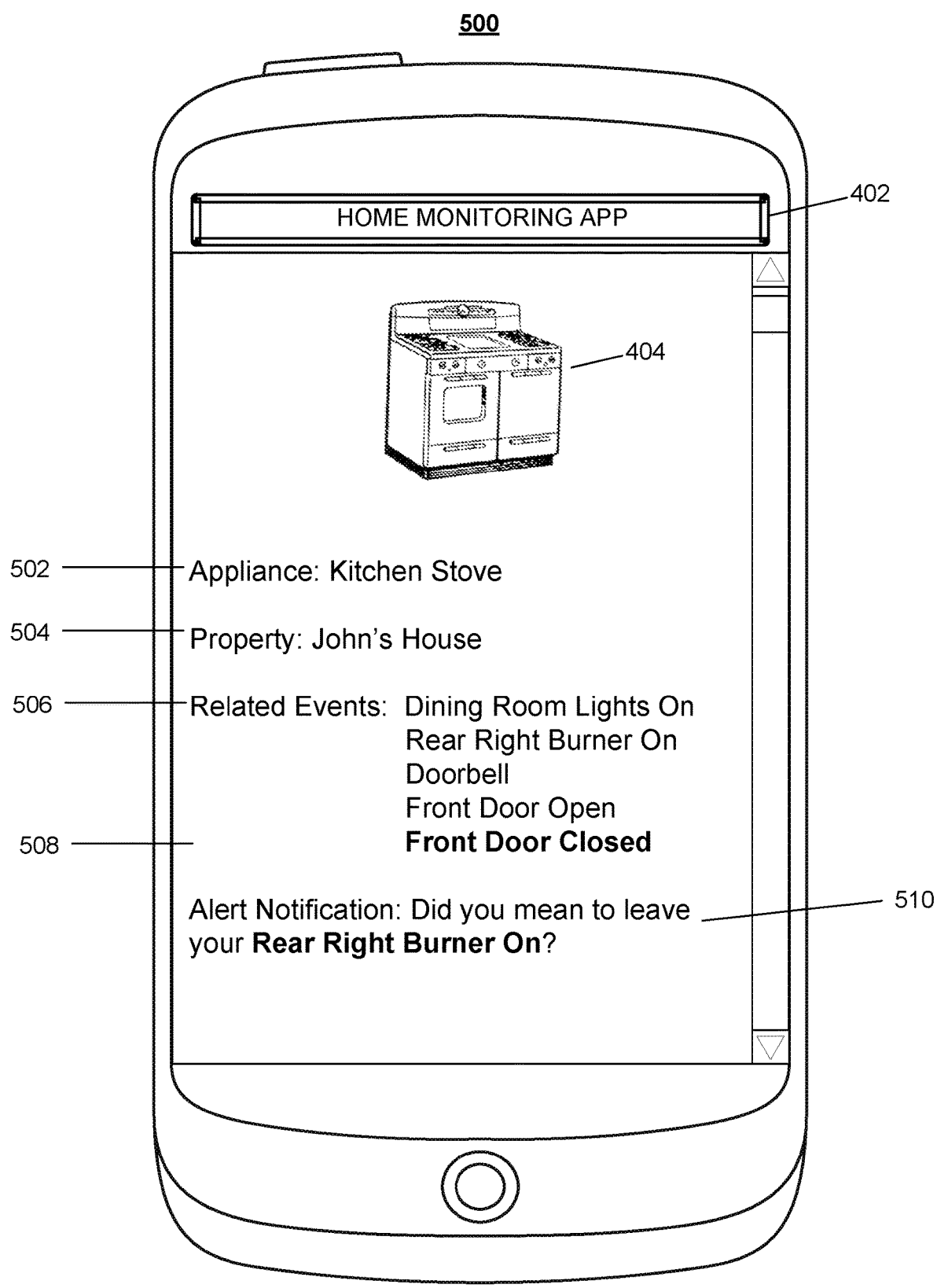

FIG. 5 illustrates a diagram of an example interface 500 of a home monitoring application that integrates sensor data collected from a knob for an appliance with property monitoring technology. In some examples, the interface 500 is associated with the native control application 232 as described with respect to FIG. 2. The interface 500 includes a title 402, a photo 404, an appliance name 502, a property 504, related events 506, a flagged event 508, and an alert notification 510. In some examples, the interface 500 is used by a user 102 or 104 to interact with the systems 100 or 200 as described with respect to FIGS. 1-2. Similar elements across figures are represented with the same numbers.

The appliance name 502 provides the user with the name of the appliance (e.g., the stove 126) shown in the photo 404. In some examples, the appliance name 502 may be selectable to view further details about the appliance, such as warranty information, service history, etc. In some examples, the interface 500 may include more or different appliances without requiring the user to navigate to a different interface.

The property 504 provides the user with information about the property (e.g., the property 101) that the appliance is associated with. For example, the address of the property may be displayed. In some examples, a user's nickname for the property may be displayed. In some examples, one or more elements of the information provided on the interface 500 is selectable to view more information about the elements. For example, a user may be able to select the property name or address to view details about the property, such as the square footage, number of rooms, etc. In some examples, the user may be able to select the appliance name 502 to bring up a menu of other appliances that can be viewed.

The related events 506 associated with the appliance may provide the user with information about the events that occurred associated with the appliance or a notification being presented on the interface 500. In this example, the related events 506 are related to the rear right burner of the kitchen stove being left on. The related events 506 may include an abnormal event. In this example, the abnormal event is the front door closing. The server 130 may determine based on image data received from the cameras 120 that the user left the property when the front door closed. There may be more or fewer related events than the exemplary amount illustrated in FIG. 5.

The flagged event 508 may highlight events of the related events 506. There may be one or more flagged events 508. For example, events determined to be abnormal may be displayed in a visually different way. Events may be determined to be abnormal if they are events the user does not intend to happen. For example, a Front Door Closed event while a burner of the kitchen stove is still on may be flagged as abnormal. Events may be automatically determined to be abnormal by the systems 100 or 200. For example, if an event such as a television on event has never occurred within the property 101, the server 130 may determine the television on event to be abnormal and flag the event. In some examples, the server 130 may use techniques such as machine learning to detect abnormal events. For example, the server 130 may use any of a variety of models such as decision trees, linear regression, neural networks, Bayesian networks, etc., and can be trained using a variety of approaches, such as deep learning, inductive logic, support vector machines, clustering, etc.

In some examples, if there is a flagged event 508, the server 130 may transmit a notification or alert 510 to the user's device. In this example, the server 130 transmitted an alert to the device (e.g., authorized device 140) asking whether they meant to leave the rear right burner of the kitchen stove on when they left the property. In some examples, the interface 500 may provide the alert 510 to a remote user in real time. Alerts may be provided for flagged or abnormal events 508.

For instance, after receiving the data from the knob for the appliance 126 indicating a Smoke Detected event, the monitoring control unit 110 may receive data gathered by the cameras 120, the sensors 122, and the appliances 124. The received data can include, for example, sensor data indicating occupancy information inside the property 101 at the time of the event detected by the knob for the appliance 126. In some implementations, the monitoring control unit 110 aggregates the received data from the cameras 120, the sensors 122, and the appliances 124 based on using pattern recognition techniques in order to intelligently determine subsets of the received information to transmit to the server 130.

In an example, the alert may be transmitted as a text alert that indicates data gathered by the devices within the property 101 (e.g., the cameras 120, the sensors 122, and the appliances 124) and aggregated by the monitoring control unit 110. For instance, the knob for the appliance 126 may detect a motion event within the detectable region 128 and transmit the data to the server 130 through the monitoring control unit 110. The server 130 may determine that the motion event is unusual movement based on analyzing information associated with the motion detected (e.g., time of detection, types of motion detected, etc.). In addition, the occupancy information can be used to determine the types of users that are inside the property 101 (e.g., children, adults, etc.).

Figure 6:
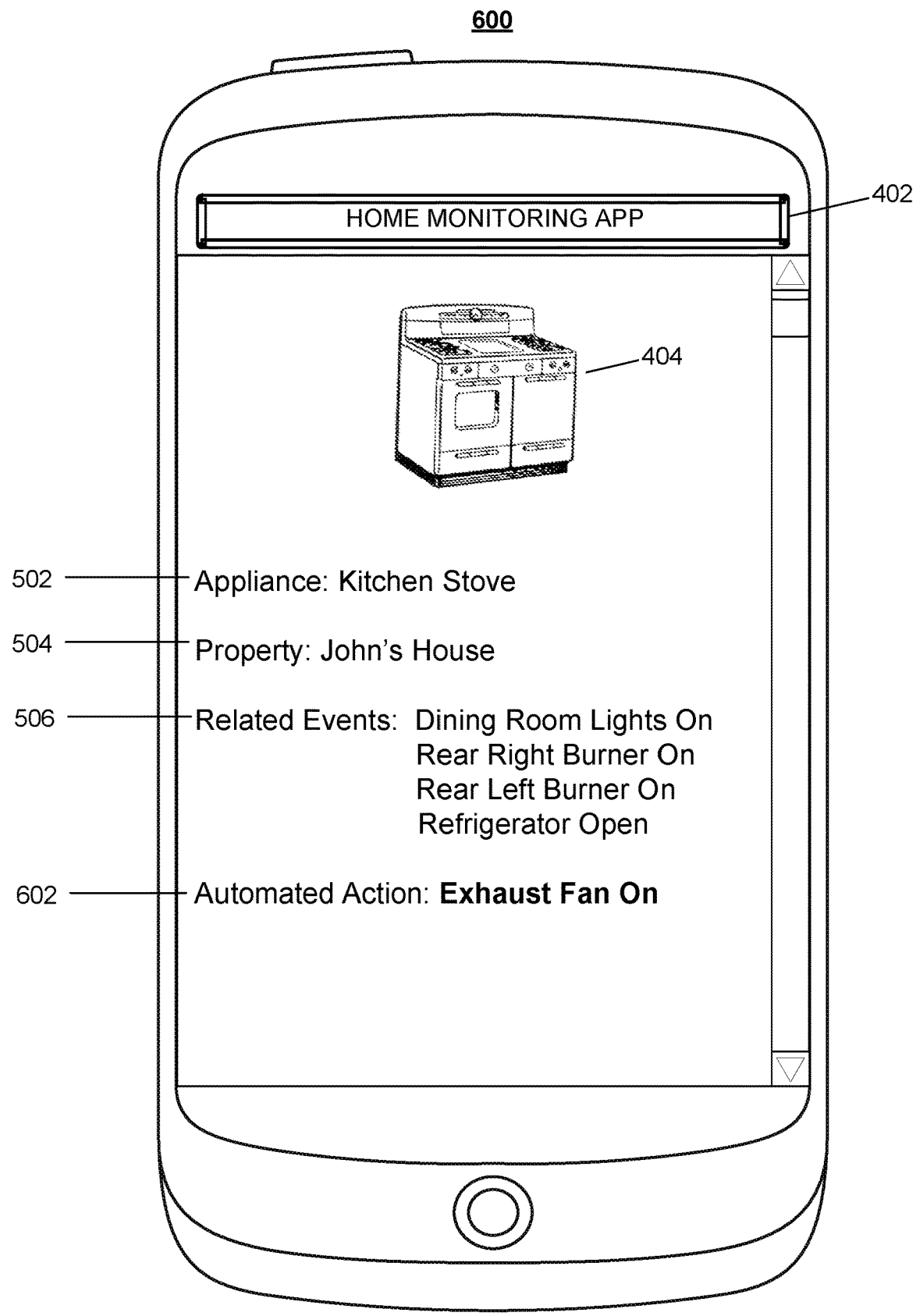

FIG. 6 illustrates a diagram of an example interface 600 of a home monitoring application that integrates sensor data collected from a knob for an appliance with property monitoring technology. In some examples, the interface 600 is associated with the native control application 232 as described with respect to FIG. 2. The interface 600 includes a title 402, a photo 404, an appliance name 502, a property 504, related events 506, and an automatic action 602 related to a monitoring system of the property. In some examples, the interface 600 is used by a user 102 or 104 to interact with the systems 100 or 200 as described with respect to FIGS. 1-2. Similar elements across figures are represented with the same numbers.

The automatic action 602 may be an action for which the server 130 automatically transmits instructions to the monitoring control unit upon detecting a knob event in data received from the knob for the appliance 126. For example, the action 602 can be automatically turning on an exhaust fan proximate to the appliance 126 when a knob event indicating that the appliance 126 (e.g., a stove 126) has been turned on.

In some examples, the action 602 may be disarming the security system. For example, the security system for a property may be armed in the evenings until persons residing in the property wake up. In this example, if, on Monday morning, the server 130 receives data from the knob for the appliance 126 indicating a knob event in which the appliance 126 has been turned on while an authorized device (e.g., the authorized device 140) of an authorized user (e.g., the authorized user 104) is detected within a detectable region (e.g., the detectable region 128) of the appliance 126, the server 130 may transmit instructions to the monitoring control unit to automatically disarm the security system.

In some examples, the server 130 uses monitoring system data to determine which rules are applied. In some examples, rules govern available actions for the server 130 to take. In some examples, different rules are applied based on the particular users detected within the property. In some examples, different rules are applied based on the status of various appliances (e.g., the appliances 124) within the property. In some examples, different rules are applied based on event data received by the server 130 from the knob for the appliance 126. Different rules may be applied based on various parameters.

In some examples, the server 130 may prevent a user from providing instructions to the monitoring control unit 110. For example, the server 130 may prevent a user from disarming the security system of the property by voice if an authorized device is not detected within the property. In some examples, the server 130 may prevent a user from changing settings of appliances if an authorized user is not detected within the property. The server 130 may only allow a user to provide instructions to the monitoring control unit 110 under certain conditions.

Figure 7:
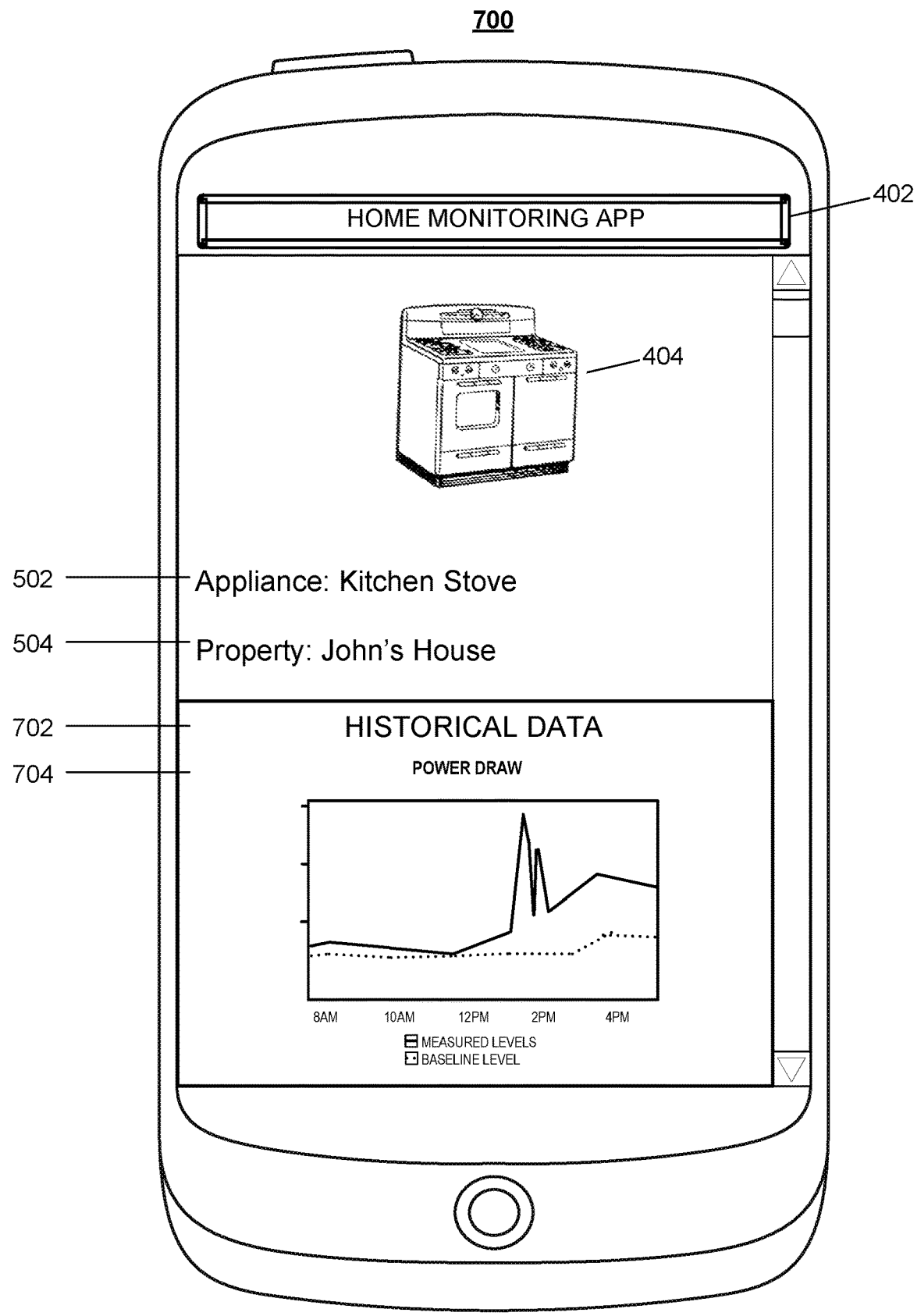

FIG. 7 illustrates a diagram of an example interface 700 of a home monitoring application that integrates sensor data collected from a knob for an appliance with property monitoring technology. In some examples, the interface 700 is associated with the native control application 232 as described with respect to FIG. 2. The interface 700 includes a title 402, a photo 404, an appliance name 502, a property 504, an analysis element title 702, and an analysis element 704. In some examples, the interface 700 is used by a user 102 or 104 to interact with the systems 100 or 200 as described with respect to FIGS. 1-2. Similar elements across figures are represented with the same numbers.

The analysis element title 702 provides information about the analysis element 704 and lets a user know what element they are viewing. For example, a user may wish to review a report on power draw of a particular appliance. In some examples, a user may select the analysis element title 702 to bring up a menu of other analysis elements available to view.

The analysis element 704 provides information about the appliance named in 502. In some examples, the analysis element 704 includes every event associated with the appliance. In some examples, the analysis element 704 includes reports on usage statistics for the appliance. For example, the analysis element 704 may include a graph of the power draw of an appliance. In some examples, the analysis element 704 can be dynamically modified to show a different appliance, a different parameter, a different type of report, etc.

For example, the analysis element 704 may allow a user to view a history of fires, smoke detection events, or gas detection events. In some examples, the analysis element 704 may allow a user to view what setting the KN216 was on, various parameters of the monitoring system, and statuses of appliances and devices in the property. In some examples, the analysis element 704 allows a user to view which persons were inside the property at the time of each of the events. The analysis element 704 may allow a user to sort and filter information. For example, a user may sort by event type, time, various settings of the monitoring system, statuses of appliances and devices in the property, statuses of the appliance 126, and other parameters.

In some examples, the server 130 can use the data collected by the monitoring control unit 110 and the knob for the appliance 126 to perform data analysis to generate the analysis element 704. For example, the server 130 may disaggregate events associated with the appliance 126 from other device data received from the monitoring control unit 110. For example, the server 130 may use data from the knob for the appliance 126 to determine when the stove 126 was on to disaggregate power usage of the stove 126 from power usage of other appliances 124 and devices in the property 101. In some examples, the server 130 may use data received from the sensors 122 to generate the analysis element 704. For example, the server 130 may receive temperature data from the sensors 122 to determine power usage.

The server 130 may be able to provide reports through the analysis element 704 that provide information such as how much it costs to cook breakfast. For example, the server 130 may receive data from remote sources with the cost of electricity and use the calculated power draw for the stove 126 to determine how much it cost for one span of time between a Stove On and Stove Off event.

The server 130 may be able to provide usage efficiency reports through the analysis element 704 that provide information such as how efficiently the appliance 126 performs relative to other appliances that perform the same functions. In some examples, the server 130 may be able to provide an anonymized comparison of power usage to other properties in the same neighborhood using remote data sources (e.g., the utility companies).

The server 130 may be able to provide time of use pricing alerts through the analysis element 704 that inform a user when utility prices change. For example, in an area with time of use rates for electricity, the server 130 may monitor pricing through a remote data source such as a utility company's published schedule and alert a user when the prices change.

In some examples, the server 130 can monitor devices associated with the appliance 126. For example, the server 130 can monitor the level of propane in a tank connected to an outdoor grill 126 and predict when a refill is needed based on usage patterns. The server 130 may monitor other parameters, such as the time between service events (e.g., filter changes, cleanings, etc.).

Figure 8:
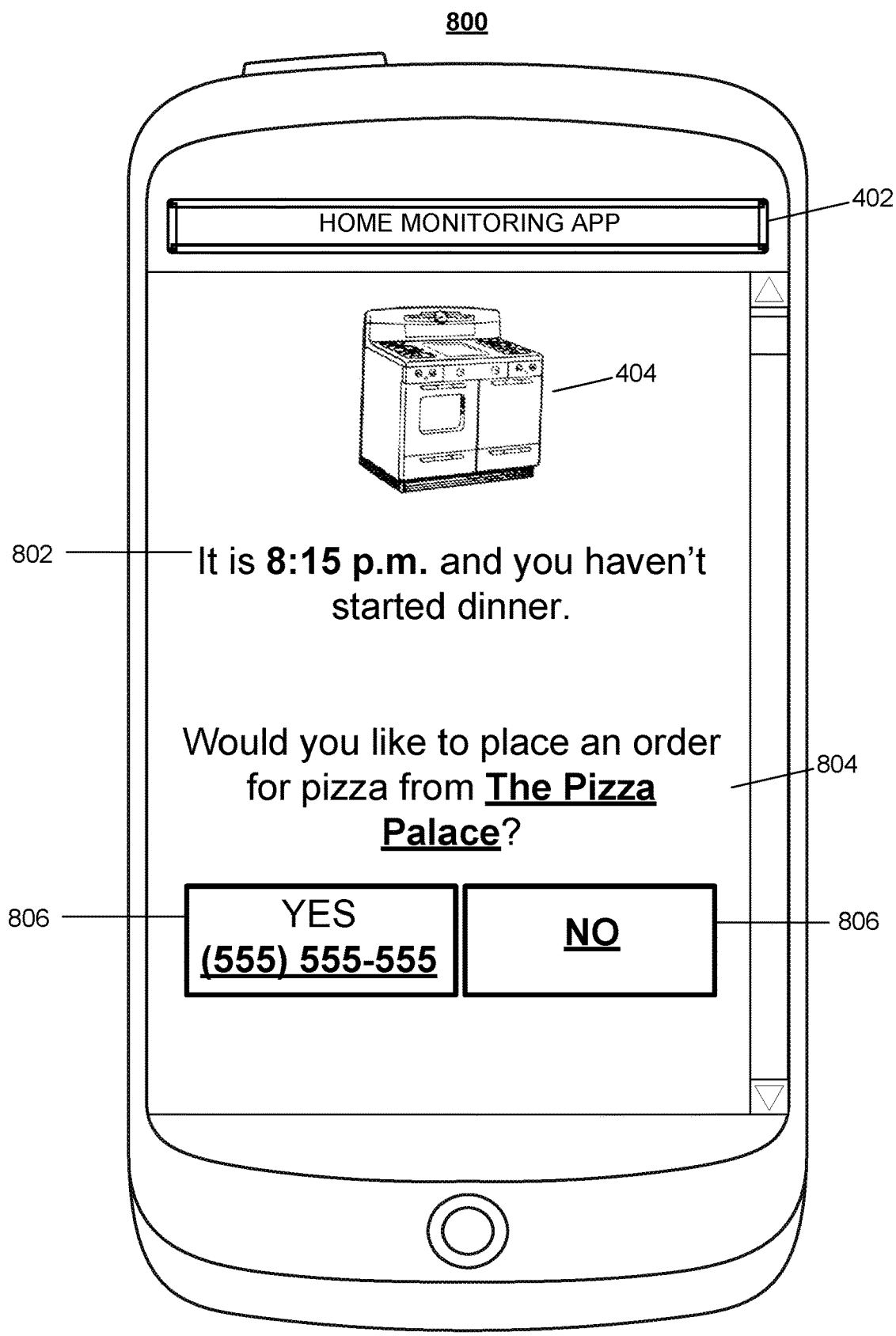

FIG. 8 illustrates a diagram of an example interface 800 of a home monitoring application that integrates sensor data collected from a knob for an appliance with property monitoring technology. In some examples, the interface 800 is associated with the native control application 232 as described with respect to FIG. 2. The interface 800 includes a title 402, a photo 404, notification text 802, suggestion text 804, and user input elements 806. In some examples, the interface 800 is used by a user 102 or 104 to interact with the systems 100 or 200 as described with respect to FIGS. 1-2. Similar elements across figures are represented with the same numbers.

In some examples, the server 130 may deliver targeted notifications based on a user's preferences and usage history. For example, the server 130 may deliver a notification with notification text 802 that informs the user of the reason they are seeing the notification. In some examples, events that trigger notifications may include an abnormal event in which the appliance 126 is not turned on, a period of uncharacteristic disuse of the appliance 126, an abnormal event in which the appliance 126 is turned on for a period of time, etc.

In this particular example, the notification is triggered when the server 130 determines that a user who normally begins making dinner well before 8:15 p.m. has not turned on the stove 126. The server 130 may provide a notification with text 802 informing the user that they are receiving the notification because they have not started making dinner.

Suggestion text 804 may include text that suggests an action or service to the user. The suggestions may be selected from a remote data source. For example, the systems 100 or 200 may communicate with an external data store that maintains a ranked list of suggestions. In some examples, a service is suggested in the text 804. For example, if a user often orders Italian food, the suggestion text 804 may present Italian food restaurants first. In some examples, if a user often uses the stove 126, the suggestion text 804 may present a suggestion of an ingredient delivery service. In these examples, the service suggested may be selected based on a ranked list of suggestions. The rankings may be affected by a user's preferences and history as well as scores of candidates. Candidate services may be ranked based on proximity to the property 101, ratings, auction results, etc.

User input elements 806 allow the user to respond to the suggestion text 804. In some examples, the user input elements 806 are similar to the user input elements 412. In some examples, the user input elements 806 include contact information (e.g., a phone number, an address, an email address, etc.) for a service suggested. In some examples, the user may select the contact information to automatically launch relevant applications. For example, a user may select a phone number of a delivery service on a mobile device to automatically dial the number. A user may select an address of a restaurant to automatically open a navigation application with directions from the user's location to the restaurant. In some examples, the server 130 stores a user's responses and learns from historical answers whether to present the user with a suggestion. For example, if a user never responds affirmatively to a suggestion, the server 130 may cease to present the user with suggestions. In some examples, if a user always responds affirmatively to a suggestion, the server 130 may ask the user if they would like to change their settings such that the server 130 provides instructions to the monitoring control unit 110 to automatically perform an action when a certain event occurs. For example, if the user always orders a pizza when it is suggested after 8 p.m., the server 130 may ask the user if they would like to allow the monitoring control unit 110 to automatically order a pizza if a Stove On event is not detected in the data provided by the knob for the appliance 126 by 8 μm.

Other arrangements and distribution of processing is possible and contemplated within the present disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A monitoring system that is configured to monitor a property, the monitoring system comprising:
   a sensor that is configured to generate sensor data that reflects an attribute of the property;
   a first appliance that is located at the property and that is configured to generate appliance data that reflects a state of the first appliance;
   a second appliance that is located at the property; and
   a monitor control unit that is configured to:
      receive the appliance data and the sensor data;
      based on the appliance data, determine that the first appliance is in an active state;
      based on the sensor data and the appliance data, determine that the first appliance being in the active state violates a rule of the first appliance in view of the attribute of the property;
      based on the determination that the first appliance being in the active state violates the rule of the first appliance in view of the attribute of the property, determine a function for the second appliance to perform that mitigates an impact to the property caused by the first appliance being in the active state; and
      provide, for output to the second appliance, an instruction to perform the function that mitigates the impact to the property caused by the first appliance being in the active state.

2. The system of claim 1, wherein the monitor control unit is configured to:
   based on the sensor data and the appliance data, set a timer for switching the first appliance to an inactive state.

3. The system of claim 1, wherein the monitor control unit is configured to:
   provide, for output, a notification indicating the violation of the rule of the first appliance in view of the attribute of the property.

4. The system of claim 1, wherein the monitor control unit is configured to:
   based on the sensor data and the appliance data, determine that a resident of the property exited the property after activating the first appliance; and
   determine that the first appliance being in an active state violates a rule of the first appliance in view of the attribute of the property based further on determining that the resident of the property exited the property after activating the first appliance.

5. The system of claim 4, wherein:
   the sensor is a motion sensor and the sensor data is motion sensor data that reflects movement at the property, and the monitor control unit is configured to determine that the resident of the property exited the property after activating the first appliance based further on the motion sensor data.

6. The system of claim 4, wherein:
the sensor is a short range radio sensor and the sensor data is short range radio data that reflects a location of a mobile device, and
the monitor control unit is configured to determine that the resident of the property exited the property after activating the first appliance based further on the short range radio data.

7. The system of claim 1, wherein the monitor control unit is configured to:
provide, for output, a notification indicating that the second appliance has been instructed to perform the function that mitigates the impact to the property caused by the first appliance being in the active state.

8. The system of claim 1, wherein the monitor control unit is configured to:
based on previous appliance data and previous sensor data, determine property usage patterns of a resident of the property and appliance usage patterns of the first appliance; and
generate the rule of the first appliance based on the property usage patterns and the appliance usage patterns.

9. The system of claim 1, wherein the monitor control unit is configured to determine that the first appliance being in an active state violates a rule of the first appliance in view of the attribute of the property by:
determining that the sensor data does not reflect movement in a vicinity of the first appliance for at least a threshold period of time after the first appliance is in the active state.

10. The system of claim 1, wherein the appliance data indicates a position of a control on the first appliance.

11. A computer-implemented method comprising:
receiving, by a monitoring system that is configured to monitor a property and from a first appliance that is located at the property, appliance data that reflects a state of the first appliance
receiving, by the monitoring system and from a sensor that is located at the property, sensor data that reflects an attribute of the property;
based on the appliance data, determining, by the monitoring system, that the first appliance is in an active state;
based on the sensor data and the appliance data, determining, by the monitoring system, that the first appliance being in the active state violates a rule of the first appliance in view of the attribute of the property;
based on the determination that the first appliance being in the active state violates the rule of the first appliance in view of the attribute of the property, determining, by the monitoring system, a function for a second appliance that is located at the property to perform that mitigates an impact to the property caused by the first appliance being in the active state; and
providing, by the monitoring system and for output to the second appliance, an instruction to perform the function that mitigates the impact to the property caused by the first appliance being in the active state.

12. The method of claim 11, comprising:
based on the sensor data and the appliance data, setting, by the monitoring system, a timer for switching the first appliance to an inactive state.

13. The method of claim 11, comprising:
providing, for output by the monitoring system, a notification indicating the violation of the rule of the first appliance in view of the attribute of the property.

14. The method of claim 11, comprising:
based on the sensor data and the appliance data, determining, by the monitoring system, that a resident of the property exited the property after activating the first appliance,
wherein determining that the first appliance being in an active state violates a rule of the first appliance in view of the attribute of the property is based further on determining that the resident of the property exited the property after activating the first appliance.

15. The method of claim 14, wherein:
the sensor is a motion sensor and the sensor data is motion sensor data that reflects movement at the property, and
the method comprises determining, by the monitoring system, that the resident of the property exited the property after activating the first appliance based further on the motion sensor data.

16. The system of claim 14, wherein:
the sensor is a short range radio sensor and the sensor data is short range radio data that reflects a location of a mobile device, and
the method comprises determining, by the monitoring system, that the resident of the property exited the property after activating the first appliance based further on the short range radio data.

17. The method of claim 11, comprising:
providing, for output by the monitoring system, a notification indicating that the second appliance has been instructed to perform the function that mitigates the impact to the property caused by the first appliance being in the active state.

18. The method of claim 11, comprising:
based on previous appliance data and previous sensor data, determining, by the monitoring system, property usage patterns of a resident of the property and appliance usage patterns of the first appliance; and
generating, by the monitoring system, the rule of the first appliance based on the property usage patterns and the appliance usage patterns.

19. The method of claim 11, wherein determining that the first appliance being in an active state violates a rule of the first appliance in view of the attribute of the property comprises:
determining that the sensor data does not reflect movement in a vicinity of the first appliance for at least a threshold period of time after the first appliance is in the active state.

20. The method of claim 11, wherein the appliance data indicates a position of a control on the first appliance.

* * * * *